United States Patent
Ishii

(10) Patent No.: US 8,139,011 B2
(45) Date of Patent: Mar. 20, 2012

(54) LIQUID CRYSTAL DISPLAY DEVICE AND ITS DRIVING METHOD

(75) Inventor: Hiromitsu Ishii, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 810 days.

(21) Appl. No.: 12/263,326

(22) Filed: Oct. 31, 2008

(65) Prior Publication Data

US 2009/0109361 A1  Apr. 30, 2009

(30) Foreign Application Priority Data

Oct. 31, 2007  (JP) .................................. 2007-284603
Oct. 10, 2008  (JP) .................................. 2008-264664

(51) Int. Cl.
*G09G 3/36* (2006.01)
*G02F 1/1343* (2006.01)
*G02F 1/1333* (2006.01)

(52) U.S. Cl. ................. 345/94; 345/99; 349/39; 349/94
(58) Field of Classification Search ...................... 345/94
See application file for complete search history.

(56) References Cited

U.S. PATENT DOCUMENTS

2009/0167742 A1* 7/2009 Nakagawa et al. ........... 345/211
2010/0156963 A1* 6/2010 Shiomi .......................... 345/691

FOREIGN PATENT DOCUMENTS

JP    2001-255851 A    9/2001

* cited by examiner

*Primary Examiner* — Alexander S Beck
*Assistant Examiner* — Charles V. Hicks
(74) *Attorney, Agent, or Firm* — Chen Yoshimura LLP

(57) ABSTRACT

A liquid crystal display device is disclosed comprising a display part, a scanning line driving circuit, a signal line driving circuit, a counter electrode driving circuit for providing counter electrodes with a counter electrode driving signal reversed in phase from a signal line driving circuit, an auxiliary capacitance having one end connected to an output end of each of switching elements, and an auxiliary capacitance line driving circuit for driving a plurality of auxiliary capacitance lines arranged in rows and has ends of such auxiliary capacitances in each row commonly connected thereto, wherein the auxiliary capacitance line driving circuit is adapted to apply a first voltage to the auxiliary capacitance lines for a first half cycle of the counter electrode driving signal and apply a second voltage thereto for a $(p+\frac{1}{2})$th cycle after the first period of the counter electrode driving signal where p is 0 or a natural number, said auxiliary capacitance line driving circuit making the auxiliary capacitance line in a floating condition after said $(p+\frac{1}{2})$ th cycle during the remaining holding time.

30 Claims, 21 Drawing Sheets

US 8,139,011 B2

LIQUID CRYSTAL DISPLAY DEVICE AND ITS DRIVING METHOD

This application claims the benefit of Japanese Application No. JP 2007-284603 filed, in Japan on Oct. 31, 2007 and Japanese Application No. JP 2008-264664 filed, in Japan on Oct. 10, 2008, both of which are hereby incorporated by reference in their entireties.

BACKGROUND OF THE INVENTION

1. Field of the Invention

The present invention relates to a liquid crystal display device and a method of driving the same and, more particularly, to a liquid crystal display device having an auxiliary capacitance at each pixel and method for driving such a liquid crystal display device.

2. Description of the Related Art

In the conventional liquid display device in which each pixel made of liquid crystal is provided with a switching element such as a thin film transistor (TFT), a voltage is applied to the liquid crystal across the switching element. FIG. 21 is a diagrammatic view illustrating each pixel 100 in the conventional liquid crystal display device and FIG. 22 is a diagrammatic view illustrating a pixel structure for each row. A pixel electrode (Pix) 101 is charged to a source potential via a transistor 102. With voltage (Vcom) applied to a counter electrode (COM) 103 to drive the counter electrode, a difference in potential between the counter electrode 103 and the pixel electrode 101 generates the liquid crystal driving voltage (Vlcd).

A substrate 104 is formed with an auxiliary capacitance electrode (Cs) 105, which reduces potential variations on the pixel electrode 11 which occurs due to a gate potential change at transistor 102 and/or due to a leakage current during the "off" period. Normally, the wiring for the auxiliary capacitance electrode 105 is disposed in parallel with the gate wiring.

The wiring of the auxiliary capacitance electrode 105 is connected to the counter electrode 103. Thus, the potential of the auxiliary capacitance electrode 105 is the same as that of the counter electrode 103. The liquid crystal is driven by an alternating current (AC) to prevent burning and electrolysis.

FIG. 23 is a timing diagram illustrating driving waveforms in the above-mentioned liquid crystal display device. Waveform (A) shows a waveform of voltage applied to the counter electrode. Waveform (B) shows a signal line voltage waveform. Waveform (C) is a scanning line voltage waveform, and waveform (D) shows a liquid crystal driving voltage waveform. As shown in the figure, the voltage waveform applied to the counter electrode (Vcom) and the voltage waveform (Vs) applied to the transistor source electrode are rectangular. The scanning line voltage is applied to the transistor gate electrode (Vg). As shown in waveform FIG. 23(C), the transistor is turned on and becomes conductive when a high voltage is applied to its gate, whereas the transistor is turned off and becomes non-conductive when a low voltage is applied to its gate.

During the holding time in which the transistor is turned off, the liquid crystal driving voltage (Vlcd) remains constant even when the voltage (Vcom) applied to the counter electrode rises and falls. Because the polarity of the Vs and Vcom is reversed for the next scanning period, the liquid crystal is AC driven as its driving voltage (Vlcd) becomes positive and negative alternatively for each scanning period.

Generally, the liquid crystal display device needs to be driven at a voltage of ±4V to 5 V. As shown in FIG. 23, the rectangular wave of signal line voltage (Vs) and the rectangular wave of the counter electrode voltage (Vcom) together create an AC driving voltage. These signal waveforms are supplied from a driver LSI. A recent trend of lowering the voltage for LSI had caused the maximum voltage between Vcom and Vs to drop to as low as about 4.8 V. Although this voltage restriction is not absolute, in order to generate a voltage greater than this range of voltage from the driver LSI, a significant design change for the LSI breakdown voltage is required, entailing a large increase in area and cost of the LSIs. Because driving liquid crystal display devices requires a voltage of about ±4 to 5 volts as mentioned above, this limitation to the LSI operational voltage barely makes its use in the driving circuitry possible. However, for recently developed liquid crystal display devices of a new mode (with n-type liquid crystal of vertical alignment mode or transverse field mode), there emerge many cases where voltages in excess of 5 volts are required to achieve their full potential for high performance. This cannot be properly handled by the current LSI.

Japanese Patent Laid Open Application, JP 2001-255851 A ("JP '851" hereinafter) discloses a liquid crystal driving method in which the auxiliary capacitance electrodes are driven separately from the counter electrode, thus they are not connected to each other, to effectively increase voltages applied to pixels. In this case, the auxiliary capacitance is formed by the auxiliary capacitance electrode, the pixel electrode, and the insulation layer disposed between the auxiliary capacitance electrode and the pixel electrode. FIG. 24 is a block diagram of the liquid crystal display device shown in JP '851 and FIGS. 25 and 26 are waveform charts illustrating gate and auxiliary capacitance drive signals and voltages applied to the pixel, respectively.

In FIG. 24, the area surrounded by the dotted line 111 defines a display section for displaying an image with a plurality of pixels. The display section is scanned by scanning lines $G_1, G_2, G_3, \ldots, G_n$ and display signals are provided by signal lines $S_1, S_2, S_3, \ldots, S_m$.

Thin film transistors (TFT) 114 are arranged at intersections of the scanning lines $G_1, G_2, G_3, \ldots, G_n$ and the signal lines $S_1, S_2, S_3, \ldots, S_m$. A liquid crystal cell 115 is disposed in a pixel electrode part connected to the drain of the respective thin film transistor 114. The gate of the transistor is connected to a scanning line G and its source is connected to a signal line S.

A scanning line driving circuit 116 successively scans the scanning lines $G_1, G_2, G_3 \ldots, G_n$ so that rows of pixels are selected for each horizontal scanning period progressively from the top to the bottom, for example. A signal line driving circuit 117 outputs display signals through the signal lines $S_1, S_2, S_3, \ldots, S_m$ to provide various pixel voltages to a row of liquid crystal cells selected by a scanning line driving circuit 116 in each horizontal scanning period via transistors 114. A counter electrode 118 and its wiring lines are provided on a transparent substrate that is disposed opposite to the substrate having the above-mentioned TFTs, the pixel electrodes, etc. These two substrates sandwich the liquid crystal cells 115.

A counter electrode driving circuit 119 applies a common counter electrode voltage Vcom across all the liquid crystal cells via the counter electrode 118. One end of an auxiliary capacitance 112 provided for each pixel is connected to the drain of a transistor 114 and its other end is connected to an auxiliary capacitance line 113. As shown in the figure, a separate auxiliary capacitance line is provided for a respective row of pixel. The auxiliary capacitance line 113 for the first row of pixels is connected to a first output terminal of the auxiliary capacitance line driving circuit 110, and the auxiliary capacitance line 113 for the second row of pixels is connected to a second output terminal of the auxiliary capacitance line driving circuit 110. The auxiliary capacitance lines 113 for the third and subsequent rows of pixels are likewise connected to respective separate terminals of the auxiliary capacitance line driving circuit 110. Auxiliary capacitance line driving voltages Vst1 to Vstn are output at different timings for the scanning lines $G_1$ to $G_n$ from the first to nth output terminals of the auxiliary capacitance line driving circuit 110, respectively.

The liquid crystal display device of the JP '851 reference operates as shown by the timing diagram of FIG. 25. Waveform (A) shows gate signals $G_{sig.1}$, $G_{sig.2}$, . . . output from the scanning lines $G_1$, $G_2$, . . . , respectively, and waveform (B) shows auxiliary capacitance line driving voltages Vst1, Vst2, . . . output from the auxiliary capacitance line driving circuit 110. The gate signals $G_{sig.1}$, $G_{sig.2}$, . . . are pulses output from the scanning line driving circuit 116 of FIG. 24 for the selection of scanning lines and have a cycle period of one frame. The gate signals $G_{sig}$ will have a voltage Vgh when a row of pixels are selected and will have a voltage Vgl when they are not selected. The auxiliary capacitance line driving voltages Vst1, Vst2, . . . are a two-level voltage signal with an amplitude ΔVst. As shown in the figure, the auxiliary capacitance line driving voltage Vst1 changes by the amplitude ΔVst with a little delay after the corresponding gate signal $G_{sig.1}$ falls. The amplitude for the auxiliary capacitance line driving voltage Vst2 changes in time in a similar manner.

In the liquid crystal display device shown in JP '851, a voltage is applied to each pixel as shown in the waveform chart of FIG. 26. The gate signal $G_{sig}$ shown in the figure is output for the scanning line Gi (i=1, 2, 3, . . . , n) selected from the scanning line driving circuit 116. The voltage will be Vgh when a row of pixels are selected and Vgl when they are not selected. A DC counter electrode voltage Vcom is output from the counter electrode driving circuit 119. Thus Vcom is constant. The voltage Vd, which is the voltage at the pixel electrode, has its level changing positive and negative centering around the counter electrode voltage Vcom at a period of one frame. When a scanning gate line is selected, the pixel electrode of a liquid crystal cell 115 on the selected row is charged to a signal voltage Vsig supplied via the signal line S. However, when the gate signal $G_{sig}$ changes from Vgh to Vgl, the voltage Vd at the pixel electrode exhibits a sudden drop of voltage in the amount of Vpt due to a capacitive coupling involving a parasitic capacitance Cdg between the drain and the gate of the transistor 114. As shown in the figure, shortly thereafter, the auxiliary capacitance line driving voltage Vst falls by ΔVst, which causes the voltage Vd at the pixel electrode to further drop by K·ΔVst. Here, K is a constant that depends on the values of the capacitances involved in the capacitive coupling. In this way, a voltage Vdl which is a difference between the counter electrode voltage Vcom and the voltage Vd at the pixel electrode is applied to the liquid crystal cell 115 as the driving voltage.

In more detail, the constant K is given by equation (1) below.

$$K = Cst/(Clc + Cst + Cdg) \quad (1)$$

Here, Cst is the capacitance of auxiliary capacitance 112, Clc is the capacitance of the liquid crystal cell 115 and Cdg is the parasitic capacitance between the drain and the gate of the transistor 114.

When the scanning line Gi is again selected in the next frame, the same pixel at this time receives a signal voltage Vsig supplied via the corresponding signal line Sj. Vsig is elevated to provide for a substantially symmetrical waveform around the Vcom level. As shown in FIG. 26, when the voltage of the gate signal Gsig,i changes from Vgh to Vgl, the voltage at the pixel electrode Vd drops by Vpt due to a capacitive coupling involving the parasitic capacitance Cdg between the drain and the gate of the transistor 114. Then, shortly thereafter, the auxiliary capacitance driving voltage Vst rises by ΔVst, causing the voltage Vd at the pixel electrode to rises by K·ΔVst (where K is the same constant as before). Thereafter, the raised voltage is substantially maintained so that the voltage corresponding to a difference between the voltage Vd and the counter electrode voltage Vcom is applied to the liquid crystal cell 115 as the driving voltage. In this way, the liquid crystal panel is AC driven frame by frame.

Thus, as shown in FIG. 25, in a frame period in which the voltage Vd is lower than Vcom, the written signal Vsig is shifted downwardly by the amount Vpt, and is further shifted downwardly by the amount K·ΔVst away from Vcom. On the other hand, in a frame period in which the voltage Vd is higher than Vcom, the written voltage Vsig is shifted downwardly by the amount Vpt and is subsequently shifted upwardly by the amount K·ΔVst.

Therefore, when displaying a non-black image at a respective liquid crystal cell 115, given a desired target driving voltage amplitude of Vdl to be Vdl1 higher than Vdl0, a smaller voltage Vsig is required to generate Vdl1 that applies across the liquid crystal cell. In other words, since the voltage Vd imparted to the liquid crystal cell 115 is thus shifted by K·ΔVst away from Vcom on each side, it is possible to make the peak-to-peak amplitude Vspp' of the voltage signals applied to the signal lines smaller than the peak-to-peak amplitude Vspp for the signal limes for the conventional liquid crystal cell.

In the method of driving an auxiliary capacitance electrode which is described in JP '851, a DC voltage is applied to the counter electrode and a potential to the auxiliary capacitance electrode is driven separately from the counter electrode in synchronism with the frame cycle period so as to effectively raise the liquid crystal driving voltage (Vlcd).

However, the output signal Vst1 from the auxiliary capacitance line driving circuit 110 is a two-level voltage signal having an amplitude ΔVst and has the raising and trailing edges slightly delayed after the gate signal Gsig,1 drops. Thus, the auxiliary capacitance line driving voltages Vst need to have a waveform that is unique as compared with the waveforms of the signals on the signal lines, scanning lines, and the counter electrodes. As a result, the circuitry for providing the auxiliary capacitance line driving circuit is necessarily complex.

In the conventional liquid crystal display device shown in FIG. 23, the liquid crystal driving voltage (Vlcd) is generated as a combination of rectangular waves of the signal line voltage (Vs) and the counter electrode voltage (Vcom). As a result, if the liquid crystal driving voltage needs to be raised, a driving LSI or circuitry with increased output voltages is necessary. To have an increased signal line voltage without using such a driving LSI with an increased output voltage, one may consider using a method similar to that disclosed in JP '851 to raise the liquid crystal driving voltage by driving the auxiliary capacitance electrode. However, because JP '851 applies a DC voltage to the counter electrode, the method cannot be applied to cases where the counter electrode voltage is driven with a rectangular wave. In the conventional liquid crystal display device as shown in FIG. 23, therefore, there is a problem in that no specific circuit makeup or driving method has yet been available to raise the liquid crystal driving voltage economically and efficiently.

SUMMARY OF THE INVENTION

Accordingly, the present invention is directed to a liquid crystal display device and its driving method that substantially obviate one or more of the problems due to limitations and disadvantages of the related art.

An object of the present invention is to provide a liquid crystal display device that can generate cell voltages greater than driver LSI's or circuitry's output voltages with a simple structure.

Another object of the present invention is to provide a method of driving such a liquid crystal display device.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a liquid crystal display device including a display part including a plurality of scanning lines arranged in rows, the rows being numbered from the top consecutively starting with 1 and ending with m, a plurality of signal lines arranged in columns, the columns being numbered from the left consecutively staring with 1 and ending with n, switching elements disposed at respective intersections of said scanning lines and said signal lines, a pixel electrode connected to an output end of the respective switching element, counter electrodes capacitively coupled with the respective pixel electrodes, liquid crystal cells disposed between said pixel electrodes and said counter electrodes, thereby defining a matrix of m rows and n columns of pixels, an auxiliary capacitance whose one end is connected to an output end of each of said switching elements, and a plurality of auxiliary capacitance lines arranged in rows, each of the auxiliary capacitance lines being connected to a corresponding row of the auxiliary capacitances; a scanning line driving circuit for providing each row of said scanning lines with a scanning line driving signal having an on time and a holding time in which the switching element in each row can be turned on and off, respectively; a signal line driving circuit for providing a signal line driving signal for each column of said signal lines; a counter electrode driving circuit for providing said counter electrodes with a counter electrode driving signal having a set frequency and a set cycle; and an auxiliary capacitance line driving circuit for providing an auxiliary capacitance line driving signal for each row of said auxiliary capacitance lines, wherein said auxiliary capacitance line driving circuit is adapted to apply a first voltage to the auxiliary capacitance lines in a first half cycle of said counter electrode driving signal during the on time of said scanning line driving signal and apply a second voltage in a $(p+\frac{1}{2})$th cycle after said first half period of said counter electrode driving signal where p is 0 or a natural number, said auxiliary capacitance line driving circuit making the auxiliary capacitance line in a floating condition after said $(p+\frac{1}{2})$th cycle during the remaining holding time.

In another aspect, the present invention provides a liquid crystal display device including a display part including a plurality of scanning lines arranged in rows, the rows being numbered from the top consecutively starting with 1 and ending with m, a plurality of signal lines arranged in columns, the columns being numbered from the left consecutively staring with 1 and ending with n, switching elements disposed at respective intersections of said scanning lines and said signal lines, a pixel electrode connected to an output end of the respective switching element, counter electrodes capacitively coupled with the respective pixel electrodes, liquid crystal cells disposed between said pixel electrodes and said counter electrodes, thereby defining a matrix of m rows and n columns of pixels, an auxiliary capacitance whose one end is connected to an output end of each of said switching elements, and a plurality of auxiliary capacitance lines arranged in rows, each of the auxiliary capacitance lines being connected to a corresponding row of the auxiliary capacitances; a scanning line driving circuit for providing each row of said scanning lines with a scanning line driving signal having an on time and a holding time in which the switching element in each row can be turned on and off, respectively; a signal line driving circuit for providing a signal line driving signal for each column of said signal lines; a counter electrode driving circuit for providing said counter electrodes with a counter electrode driving signal having a set frequency and a set cycle; and an auxiliary capacitance line driving circuit for providing an auxiliary capacitance line driving signal for each row of said auxiliary capacitance lines, wherein said auxiliary capacitance line driving circuit comprises a first driving transistor and a second driving transistor connected to each of said auxiliary capacitance lines, said first driving transistor has a first main electrode connected to the other end of said auxiliary capacitance, said first driving transistor has a second main electrode connected to a counter electrode wiring (COM1) as a first common electrode, said first driving transistor has a control electrode connected to an ith row scanning line (Gi), said second driving transistor has a first main electrode connected to the first main electrode of said first driving transistor, said second driving transistor has a second main electrode connected to a second common electrode wiring (COM2), and said second driving transistor has a control electrode connected to an (i+2)th scanning line ($G_{i+2}$), and wherein said auxiliary capacitance line driving circuit is adapted to apply a first voltage to the auxiliary capacitance lines in a first half cycle of said counter electrode driving signal during the on time of said scanning line driving signal and apply a second voltage in a $(p+\frac{1}{2})$th cycle after said first half cycle of said counter electrode driving signal where p is 0 or a natural number said auxiliary capacitance line making the auxiliary capacitance line in a floating condition after said $(p+\frac{1}{2})$th cycle during the remaining holding time.

In another aspect, the present invention provides a method of driving a liquid crystal display device, said liquid crystal device including a display part that includes a plurality of scanning lines arranged in rows, the rows being numbered from the top consecutively starting with 1 and ending with m, a plurality of signal lines arranged in columns, the columns being numbered from the left consecutively staring with 1 and ending with n, switching elements disposed at respective intersections of said scanning lines and said signal lines, a pixel electrode connected to an output end of the respective switching element, counter electrodes capacitively coupled with the respective pixel electrodes, liquid crystal cells disposed between said pixel electrodes and said counter electrodes, thereby defining a matrix of m rows and n columns of pixels, an auxiliary capacitance whose one end is connected to an output end of each of said switching elements, and a plurality of auxiliary capacitance lines arranged in rows, each of the auxiliary capacitance lines being connected to a corresponding row of the auxiliary capacitances, the method comprising the steps of: providing each row of said scanning lines a scanning line driving signal having an on time and a holding time in which the switching element in each row can be turned on and off, respectively; providing a signal line driving signal for each column of said signal lines; providing said counter electrode with a counter electrode driving signal having a set frequency and a set cycle; applying a first voltage to the other end of said auxiliary capacitance for a first half cycle of said counter electrode driving signal during the on time of said scanning line driving signal and applying a second voltage for a (p+½)th cycle after said first half cycle of said counter electrode driving signal where p is 0 or a natural number; and making said auxiliary capacitance line in a floating condition after said (p+½)th cycle during the remaining holding time to thereby increase the absolute value in potential difference between said pixel electrode and said counter electrode.

In another aspect, the present invention provides a liquid crystal display device including a display part including a plurality of scanning lines arranged in rows, the rows being numbered from the top consecutively starting with 1 and ending with m, a plurality of signal lines arranged in columns, the columns being numbered from the left consecutively staring with 1 and ending with n, switching elements disposed at respective intersections of said scanning lines and said signal lines, a pixel electrode connected to an output end of the respective switching element, counter electrodes capacitively coupled with the respective pixel electrodes, liquid crystal cells disposed between said pixel electrodes and said counter electrodes, thereby defining a matrix of m rows and n columns of pixels, an auxiliary capacitance whose one end is connected to an output end of each of said switching elements, a plurality of auxiliary capacitance lines arranged in rows, each of the auxiliary capacitance lines being connected to a corresponding row of the auxiliary capacitances, and a parasitic capacitance shield wiring arranged to be interposed between the signal line and the auxiliary capacitance line at every intersection of the signal line and the auxiliary capacitance line; a scanning line driving circuit for providing each row of said scanning lines with a scanning line driving signal having an on time and a holding time in which the switching element in each row can be turned on and off, respectively; a signal line driving circuit for providing a signal line driving signal for each column of said signal lines; a counter electrode driving circuit for providing said counter electrodes with a counter electrode driving signal; and an auxiliary capacitance line driving circuit for providing an auxiliary capacitance line driving signal for each row of said auxiliary capacitance lines, wherein said auxiliary capacitance line driving circuit comprises a first and a second driving transistor connected to each of said auxiliary capacitance lines, said first driving transistor has a first main electrode connected to the other end of said auxiliary capacitance, said first driving transistor has a second main electrode connected to a counter electrode wiring (COM1) as a first common electrode, said first driving transistor has a control electrode connected to an ith row scanning line (Gi), said second driving transistor has a first main electrode connected to the first main electrode of said first driving transistor, said second driving transistor has a second main electrode connected to a second common electrode wiring (COM2), and said second driving transistor has a control electrode connected to an (i+2) th scanning line ($G_{i+2}$), and wherein said auxiliary capacitance line driving circuit is adapted to apply a first voltage to the auxiliary capacitance lines in a first half cycle of said counter electrode driving signal and apply a second voltage thereto in a (p+½)th cycle after said first period of said counter electrode driving signal where p is 0 or a natural number, said auxiliary capacitance line driving circuit making the auxiliary capacitance line in a floating condition after said (p+½)th cycle.

In another aspect, the present invention provides a method for driving a liquid crystal display, the liquid crystal display including a plurality of scanning lines disposed in rows and a plurality of signal lines disposed in columns, the plurality of scanning lines and the plurality of signal lines defining a m by n matrix of pixels, each of said pixels including a transistor having a gate, a source and a drain, the gate being connected to the adjacent scanning line, the source being connected to the adjacent signal line; a pixel electrode connected to the drain of the transistor; a liquid crystal layer over the pixel electrode; a counter electrode forming a liquid crystal cell together with the liquid crystal layer and the pixel electrode; and an auxiliary capacitance electrode capacitively coupled to the pixel electrode, the auxiliary capacitance electrode forming an auxiliary capacitance together with the pixel electrode; the method including the steps of: applying scanning pulse signals of a set frame frequency to the plurality of scanning lines to turn on the transistors in rows, thereby successively selecting the rows of pixels from the top, wherein a period during which the transistor at a pixel is turned on defines a selection period for the pixel, and a period during which the transistor at the pixel is turned off defines a holding period for the pixel, providing display signals on the signal lines in synchronization with said scanning pulse signal to charge the corresponding pixel electrodes to respective desired potentials; applying a rectangular wave signal that alternately exhibits a HIGH level and a LOW level at a set frequency to said counter electrodes, the rectangular wave signal assuming one of the HIGH and LOW levels during the selection period for each pixel; for each of the plurality of pixels, applying a first voltage to the auxiliary capacitance electrode during the selection period, and applying a second voltage that differs from the first voltage to the auxiliary capacitance electrode when the rectangular wave signal assumes said one of the HIGH and LOW levels during the holding period that follows the selection period, the auxiliary capacitance electrode being made in a floating condition immediately thereafter during the remaining holding time until the next selection period arrives for the pixel, a value of the second voltage being selected such that an absolute value of a voltage across the liquid crystal cell is raised when the second voltage is applied.

In another aspect, the present invention provides a liquid crystal display device including a plurality of scanning lines disposed in rows and a plurality of signal lines disposed in columns, the plurality of scanning lines and the plurality of signal lines defining a m by n matrix of pixels, each of said pixels including a transistor having a gate, a source and a drain, the gate being connected to the adjacent scanning line, the source being connected to the adjacent signal line; a pixel electrode connected to the drain of the transistor; a liquid crystal layer over the pixel electrode; a counter electrode forming a liquid crystal cell together with the liquid crystal layer and the pixel electrode; and an auxiliary capacitance electrode capacitively coupled to the pixel electrode, the auxiliary capacitance electrode forming an auxiliary capacitance together with the pixel electrode; a scanning line driver configured to apply scanning pulse signals of a set frame frequency to the plurality of scanning lines to turn on the transistors in rows, thereby successively selecting the rows of pixels from the top, wherein a period during which the transistor at a pixel is turned on defines a selection period for the pixel, and a period during which the transistor at the pixel is turned off defines a holding period for the pixel, a signal driver configured to provide display signals on the signal lines in synchronization with said scanning pulse signal to charge the corresponding pixel electrodes to respective desired potentials; a counter electrode driver configured to apply a rectangular wave signal that alternately exhibits a HIGH level and a LOW level at a set frequency to said counter electrodes, the rectangular wave signal assuming one of the HIGH and LOW levels during the selection period for each pixel; an auxiliary capacitance electrode driver configured to apply, for each of the plurality of pixels, a first voltage to the auxiliary capacitance electrode during the selection period, and applying a second voltage that differs from the first voltage to the auxiliary capacitance electrode when the rectangular wave signal assumes said one of the HIGH and LOW levels during the holding period that follows the selection period, the auxiliary capacitance electrode being made in a floating condition immediately thereafter during the remaining holding time until the next selection period arrives for the pixel, a value of the second voltage being selected such that an absolute value of a voltage across the liquid crystal cell is raised when the second voltage is applied.

It is to be understood that both the foregoing general description and the following detailed description are exemplary and explanatory, and are intended to provide further explanation of the invention as claimed.

BRIEF DESCRIPTION OF DRAWINGS

In the drawings:

FIGS. 12A and 12B illustrate an exemplary specific pixel structure of the device shown in FIG. 11, in which FIG. 12A is a plan view of the pixel structure, and FIG. 12B is a cross sectional view thereof;

DETAILED DESCRIPTION OF THE PREFERRED EMBODIMENTS

Figure 1:
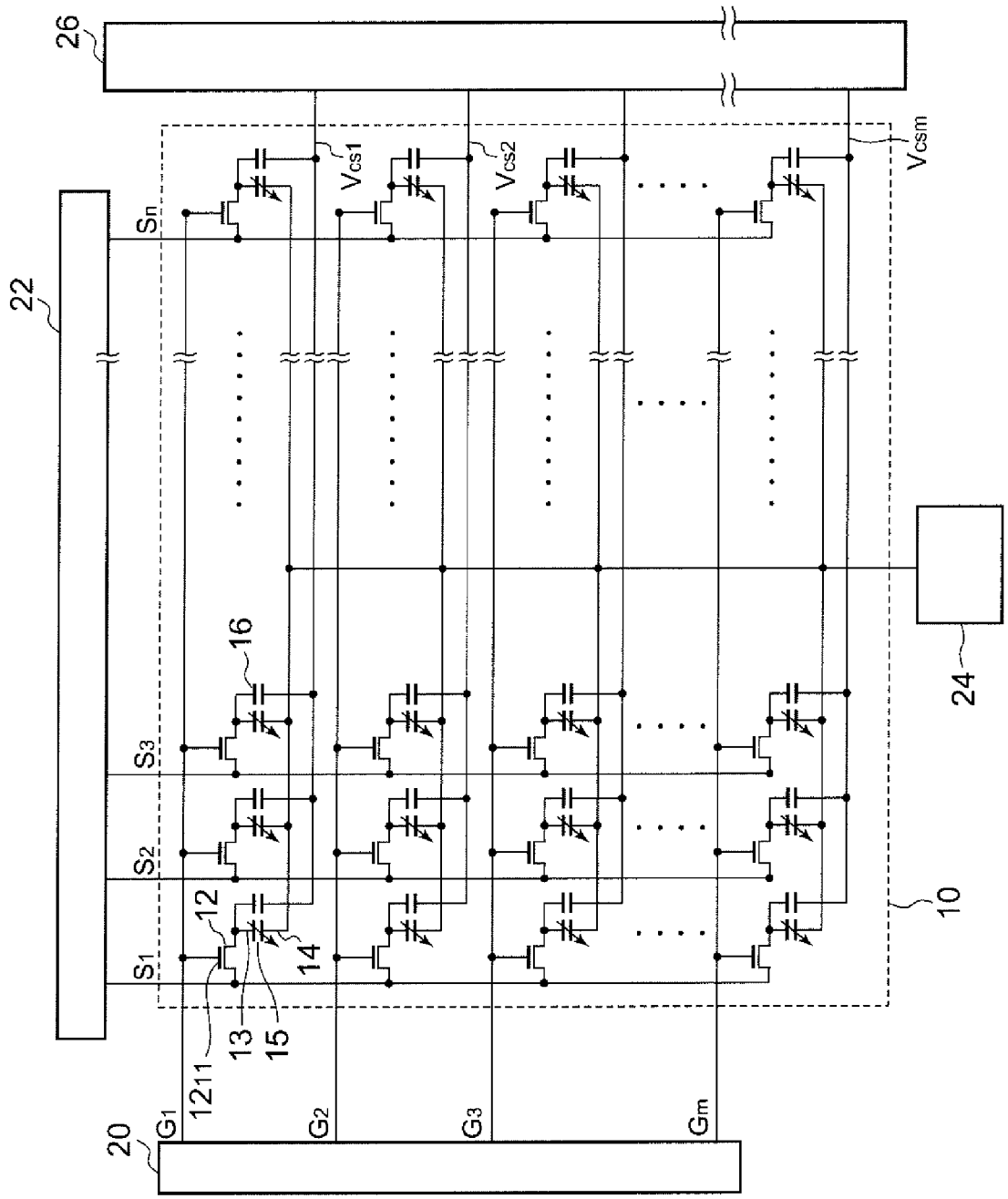
FIG. 1 is a block diagram illustrating a makeup of a liquid crystal display device according to an embodiment of the present invention.

Hereinafter, various embodiments of the present invention will be described in detail with reference to the figures in which like reference characters are used to designate like or corresponding components.

Figure 2:
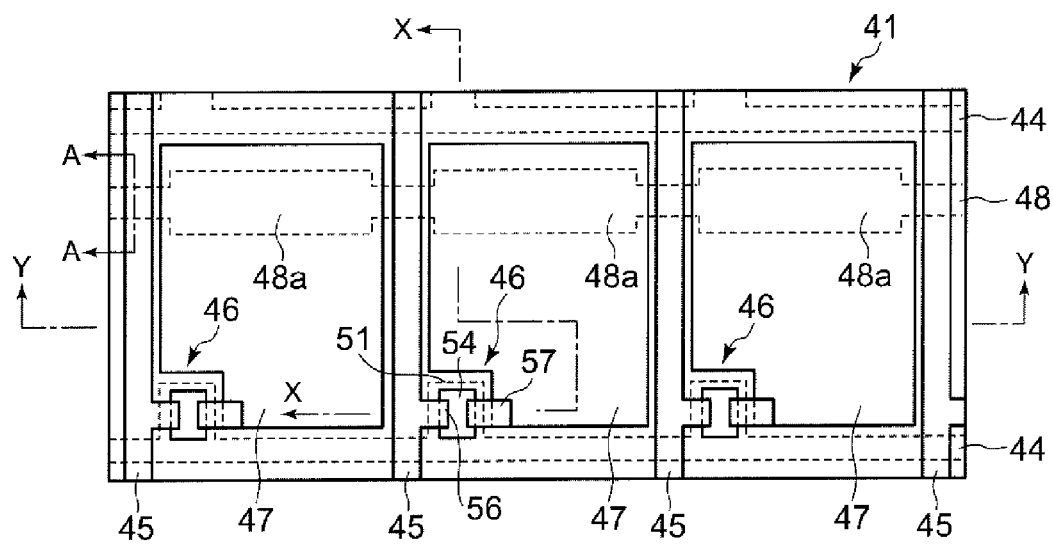
FIG. 2 is a transparent plan view of a portion of a first substrate in a color liquid crystal display device according to an embodiment of the present invention.
Figure 3A:
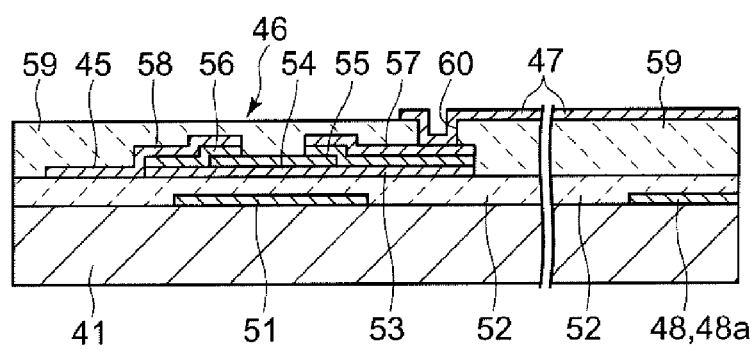
FIG. 3A is a cross sectional view taken along the line X-X in FIG. 2

FIG. 1 is a block diagram illustrating the makeup of a liquid crystal display device 1 according to an embodiment of the present invention. FIGS. 2 to 4 show an example of a display part 10 of the liquid crystal display device 1 of this embodiment.

As shown in FIG. 1, the liquid crystal display device 1 of the present embodiment includes the display part 10 defined by the dotted broken lines. Further, it includes a scanning line driving circuit 20, a signal line driving circuit 22, a counter electrode driving circuit 24 and an auxiliary capacitance line driving circuit 26 which are arranged at the periphery of the display part 10.

The liquid crystal display device 1 has a plurality of scanning lines and a plurality of signal lines arranged in rows and columns on a first transparent substrate. Switching elements 12 are disposed at intersections of the scanning and the signal lines, and for each pixel, a pixel electrode 13 is provided to be connected to the output terminal of the corresponding switching elements 12. Each pixel includes a liquid crystal cell 15 disposed between a pixel electrode 13 and a counter electrode 14. Also, an auxiliary capacitance 16 whose one end is connected to the output terminal of the corresponding switching element 12 is provided for each pixel. A pair of numbers (i, j) indicates a specific pixel where i is an integer in the range from 1 to m and j is an integer in the range from 1 to n.

In this case, there are m×n pixels. The switching element at row i and column j (i.e., at (i, j)) is denoted as switching element $12_{ij}$ for convenience. Thus, the display part 10 has a plurality of pixels arranged in a matrix of m rows and n columns. In this case, with respect to each of the rows, the gate (or control) electrodes of the switching elements 12 belonging to one row are all connected to a single scanning line, thereby being connected to each other. Thus, the control (or gate) electrode wirings in rows 1, 2, 3, . . . , m are connected to scanning lines $G_1, G_2, G_3, \ldots, G_m$, respectively, that originate from the scanning line driving circuit 20.

The source electrodes (the first main electrode) of the switching elements 12 disposed in one column are connected to a corresponding signal line $S_1$ and therefore are connected to one another. Thus, the source electrode wirings in columns 1, 2, 3, . . . , n are connected to signal lines $S_1, S_2, S_3, \ldots, S_n$, respectively, that originate from the signal line driving circuit 22. The signal lines carry display signals for formation of an image on a display.

The liquid crystal cell is formed between the pixel electrode 13, which is connected to the drain (the second main electrode) of the corresponding switching element 12, and a counter electrode 14, which is formed on an opposite substrate, for example. The switching electrode 12 is, for example, a transistor. The transistor 12 can be a thin film transistor fabricated using amorphous silicon or low-temperature polysilicon. As mentioned above, the gate of the transistor 12 is connected to a scanning line and its source or like terminal is connected to a signal line S. In this example, the counter electrode 14 and a wiring therefor are formed on a second transparent substrate, which is not shown in FIG. 1. The pixel electrode 13 and the counter electrode 14 define a liquid crystal cell 15 for a respective pixel.

The scanning line driving circuit 20 outputs to the scanning line in each row a scanning line driving signal. The scanning line driving signal has an on-period and an off-period. During the on period, the switching elements 12 connected to that scanning line are all turned on, and the off-period is provided as the signal holding time for the corresponding pixels. The scanning line driving circuit 20 scans the scanning lines $G_1$, $G_2, G_3, \ldots, G_m$ successively to select one row of pixels at a time.

The signal line driving circuit 22 outputs to the signal lines of the respective columns a signal line driving signals in synchronism with the on time period of the switching elements 12. That is, the signal line driving circuit 22 provides the signal line $S_1, S_2, S_3, \ldots, S_n$ with display signals. It provides pixel voltages with respect to one row of liquid crystal cells that is selected by the scanning line driving circuit 20 via the transistors 12 for a given horizontal synchronization period.

The counter electrode driving circuit 24 applies a voltage signal Vcom to all the counter electrodes 14 formed on the second transparent substrate.

An auxiliary capacitance 16 has one end connected to the pixel electrode 13, which is connected to the drain of the transistor 12, and has the other end connected to the auxiliary capacitance line driving circuit 26. As shown in FIG. 1, with respect to each row, such other ends of auxiliary capacitances 16 in one row are connected to each other, and are connected to the auxiliary capacitance line driving circuit 26. Thus, auxiliary capacitance lines for the row numbers 1, 2, 3, ~, m are connected to the 1st, 2nd, 3rd, . . . , the m-th output terminals, respectively, of the auxiliary capacitance line driving circuit 26. Signals Vcs1, Vcs2, . . . , Vcsm are respectively outputted from the 1st, 2nd, . . . , the m-th output terminals.

It should be noted here that while the liquid crystal display device 1 of this example is illustrated as a black-and-white display. This embodiment of the present invention can also be applicable to color displays with appropriate modifications, which can readily be discerned by a person of ordinary skill in the art.

FIG. 2 is a transparent plan view illustrating a portion of a first substrate 41, in the color liquid crystal display device 1 according to the above embodiment of the present invention. FIG. 3A is a cross sectional view of the device taken along the line X-X in FIG. 2 and FIG. 3B is a cross sectional view of the device including a second substrate 42, taken along the line Y-Y in FIG. 2.

As shown in FIG. 2, the first substrate 41 is provided with a plurality of scanning lines 44 and a plurality of signal lines 45 which extend in directions of a row and a column, respectively. At each intersection of a scanning line 44 and a signal line 45, there is provided a thin film transistor 46 connected to these lines 44 and 45. The thin film transistor 46 drives a pixel electrode 47 connected thereto. Also, at the side opposite to the scanning line 44 across the pixel electrode 47, an auxiliary capacitance line 48 is provided under the pixel electrode 47. The auxiliary capacitance line 48 extends in the row direction.

Figure 3B:
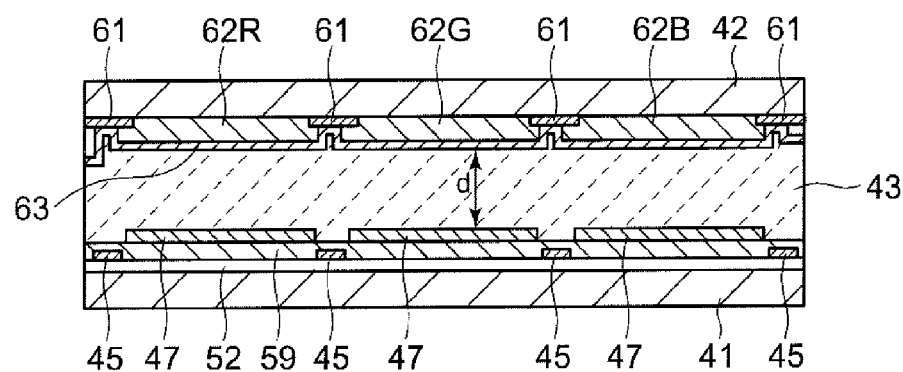
FIG. 3B is a cross sectional view including a second substrate at a part taken along the line Y-Y in FIG. 2.
Figure 4:
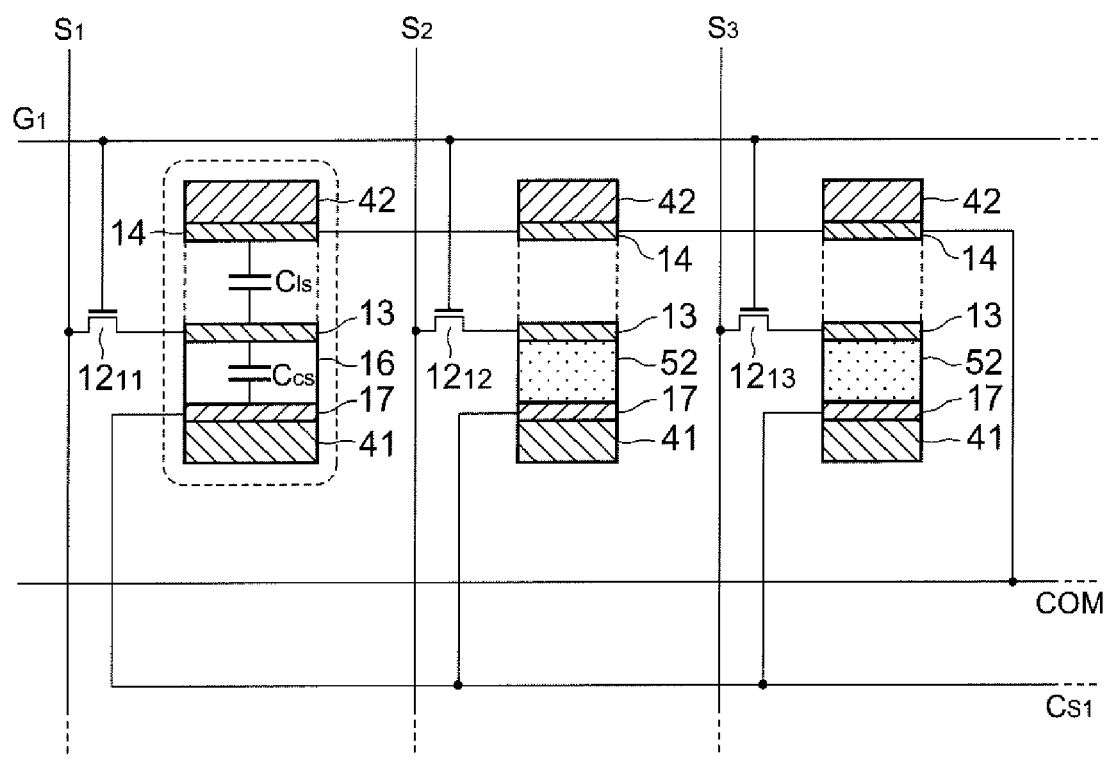
FIG. 4 is a block diagram illustrating an equivalent circuit of a structure of pixels on a first row in the first to third columns.

As shown in FIG. 3B, in this color liquid crystal display device 1, the first substrate 41 and the second substrate 42 positioned above the first substrate 41 as its opposing substrate are united via a sealing member (not shown) substantially in the form of a square frame, and the space between the two substrates 41 and 42 is charged with a liquid crystal 43.

Mention is next made of a specific structure of the thin film transistor 46 and other elements in FIG. 3A. A scanning line 44 including a gate electrode 51 is disposed on a certain portion of the upper surface of the first substrate 41. An auxiliary capacitance line 48 whose upper surface is entirely covered with a gate insulating film 52 is disposed on other portions of the upper surface of the first substrate 41.

At a selected site on the upper surface of the gate insulating film 52 a semiconductor film 53 made of intrinsic amorphous silicon is formed. On the upper surface of the semiconductor thin film 53, a channel protective film 54 is formed at a site that is over the gate electrode 51, but that is smaller than an area corresponding to the gate electrode 51. Contact layers 55 and 56 of n-type amorphous silicon are formed in contact with the respective sides of the upper surface of the channel protective layer 54 and with the upper surface of the semiconductor thin film 53.

A drain electrode 57 is formed on the contact layer 55. A signal line 45 that includes a source electrode 58 is formed on the contact layer 56 and on a certain portion of the gate insulating film 52.

The gate electrode 51, the gate insulating film 52, the semiconductor thin film 53, the channel protective film 54, the contact layers 55 and 56, the drain electrode 57 and the source electrode 58 together make up a thin film transistor 46.

The thin film transistor 46 and the gate insulating film 52 are entirely covered with an overcoat film 59 of an insulating material. The overcoat film 59 may also be a flattening film. The overcoat film 59 is formed with a contact hole 60 corresponding in position to the drain electrode 57. A pixel electrode 47 is formed at a selected site on the overcoat film 59. The pixel electrode 47 may be a transparent electrode made of ITO. The pixel electrode 47 is connected to the drain electrode 57 via the contact hole 60.

Mention is next made of the second substrate 42 with reference to FIG. 3B. The second substrate 42 is provided on its lower surface (the surface opposed to the first substrate 41) with black matrices 61 and R, G and B color filter elements 62R, 62G and 62B. The color filter elements 62R, 62G and 62B are disposed so as to face their corresponding pixel electrodes 47.

A counter electrode 63, which is made of a transparent electrode of ITO, is formed on the lower surfaces of the black matrix 61 and the color filter element 62R, 62G, 62B. A pixel capacitor is formed by the pixel electrode 47, the counter electrode 63 opposed to it and the liquid crystal 43 charged between them. In this example, the capacitances of the pixel capacitors are the same among them because all the pixel electrodes 47 have the same area.

As shown in FIG. 2, a portion of the auxiliary capacitance line 48 which overlaps with a pixel electrode 47 constitutes an auxiliary capacitance electrode 48a for each pixel. These overlapping portions provide the auxiliary capacitances 16 shown in FIG. 1. In other words, the auxiliary capacitance 16 in the color liquid crystal display device 1 shown in FIGS. 2 and 3 are formed by the auxiliary capacitance electrode 48a, the insulating films 52 and 59 and the pixel electrode 47 made of a transparent electrode provided over the films 52 and 59.

All the pixel electrodes 47 are formed on the same plane, regardless of whether they correspond to color filter element 62R, 62G, or 62B. Therefore, the vertical gap between the pixel electrode 47 and the counter electrode 63 is the same (as indicated by "d" in FIG. 3B) in this particular example.

Here, if desired, one or more of the driving circuits 20, 22 and 26 may be integrally formed on the same first substrate to save external circuitry requirements. For example, the thin film transistors 12 and all these driving circuits may be formed on the first transparent substrate 41 using low-temperature polysilicon processing.

It should be noted that while in this example of the color liquid crystal display device shown in FIGS. 2 and 3, the auxiliary capacitance 16 is formed of the auxiliary capacitance electrode 48a, the insulating films 52 and 59, and the pixel electrode 47, other structures for the auxiliary capacitance may be adopted depending on a particular pixel structure and other needs, for example.

FIG. 4 is a block diagram illustrating an equivalent circuit of a structure of pixels at a first row over the first to third columns, in which Clc indicates the pixel capacitance and Ccs indicates the auxiliary capacitance 16. A pair of numbers in the subscript of the reference numeral 12 for each switching element indicates the corresponding row and column. The auxiliary capacitance line in the first raw is indicated by Cs1.

When a HIGH signal Vgh is provided on the $G_1$ line to select that row, the gates of the switching elements 12 connected to the same $G_1$ line all become HIGH and the switching elements 12 in that row are turned on so that the pixel electrodes 13 are provided with voltages corresponding to the signals applied to $S_1$, $S_2$, $S_3$, . . . , respectively. To with, in its on state, the auxiliary capacitance line driving circuit 26 applies a first voltage to the other end of an auxiliary capacitance 16, i.e. an auxiliary capacitance electrode 17, in a first period of a counter electrode driving signal. In a (p+½) period where p is 0 or a natural number after the first period of the counter electrode driving signal, a second voltage is applied to it to provide an output which holds its off state for a hold time subsequent to the (p+½) period. The counter electrode driving signal is furnished at a selected timing timed to a scanning line driving signal for each raw.

This permits increasing the absolute value of a potential difference between the pixel electrode 13 and the counter electrode 14.

Figure 5:
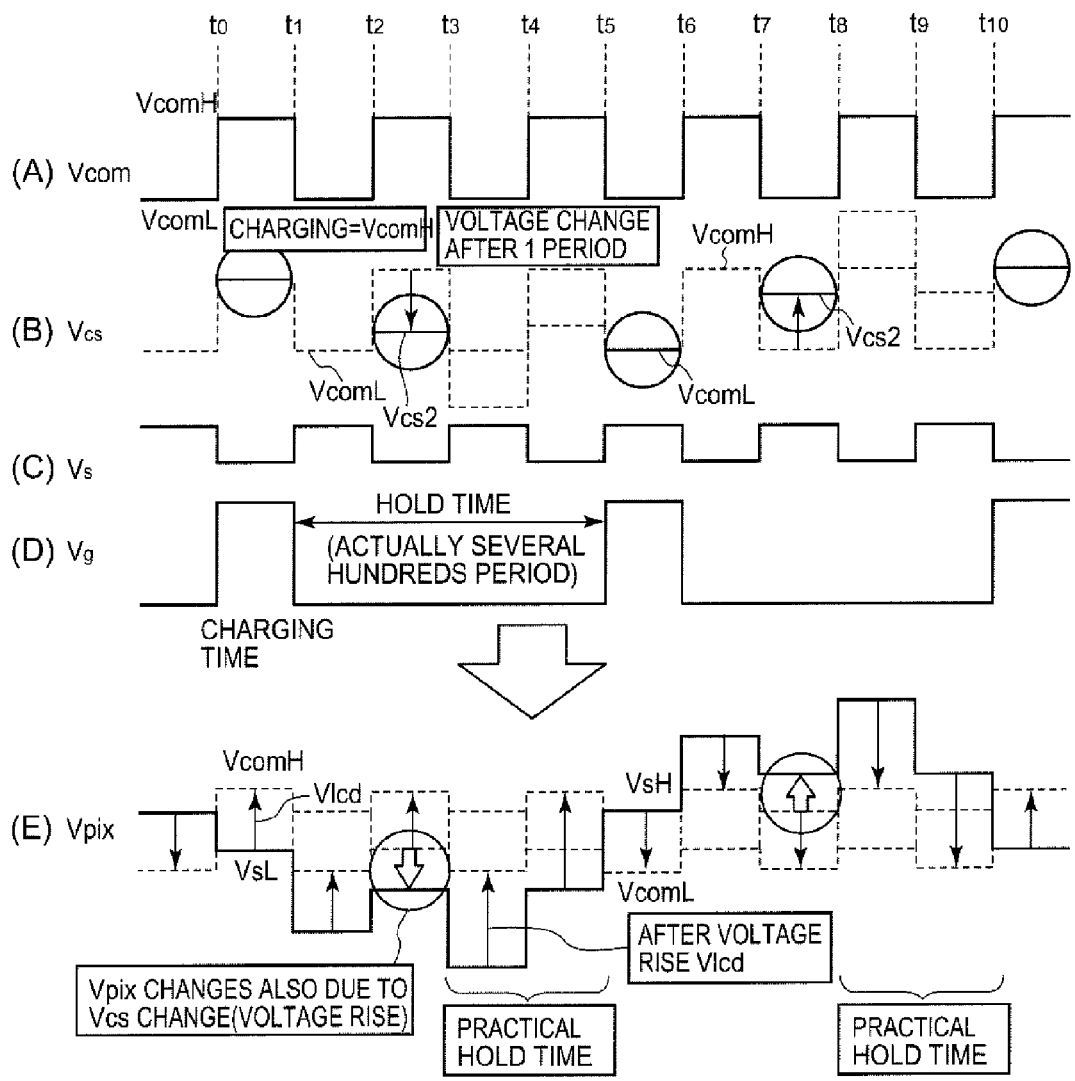
FIG. 5 depicts waveforms for illustrating a method of driving a liquid crystal display device 1 in accordance with an embodiment of the present invention, in which (A) shows a counter electrode driving signal, (B) shows an auxiliary capacitance line driving signal, (C) shows a signal line signal, (D) shows a scanning line driving signal and (E) shows the voltage level at the pixel electrode as well as the voltage applied to the pixel (the voltage difference between the pixel electrode and the counter electrode)

FIG. 5 depicts waveforms for illustrating a method of driving a liquid crystal display device 1 in accordance with an embodiment of the present invention, in which (A) shows a counter electrode driving signal, (B) shows an auxiliary capacitance line driving signal, (C) shows a signal line signal, (D) shows a scanning line driving signal and (E) shows the voltage level at the pixel electrode as well as the voltage applied to the pixel (the voltage difference between the pixel electrode 13 and the counter electrode 14).

As shown in FIG. 5(A), the counter electrode driving signal is a rectangular wave having a HIGH level VcomH and a low level VcomL alternately appearing with a pulse width that corresponds to the pulse width of the scanning line driving signals Vg. The counter electrode driving signal is a waveform having a HIGH level (VcomH) and a low level (VcomL) at periods of $t_0$ to $t_1$ and $t_5$ to $t_6$ where the scanning line driving signal Vg is the on state. Note that FIG. 5(C) shows an example where the largest possible voltage is being applied to the pixel. As shown in FIG. 5(D), the scanning line driving signal Vg is a rectangular wave having its HIGH level during the charging periods of $t_0$ to $t_1$ and $t_5$ to $t_6$ and its amplitude low in level in holding times of $t_1$ to $t_5$ and $t_6$ to $t_{10}$. Note that in actuality, the time interval between $t_1$ and $t_5$ is filled with several hundred more pulses than a few pulses depicted in the figure. Note also that the level of the counter electrode driving signal Vcom is reversed for the period $t_5$ to $t_6$ as compared with that for the period $t_0$ to $t_1$. This occurs alternately for respective frames.

Here, for the counter electrode driving signal, auxiliary capacitance driving signal and signal line driving signals, the times $t_0$ to $t_2$ and $t_2$ to $t_4$ are referred to as a first and a second cyclic period, respectively. Also, one cyclic period of the scanning line driving signal consists of the on time (also referred to as charging time) in which the switching element 12 is rendered conductive and the holding time in which the switching element 12 is rendered nonconductive.

The counter electrode driving signal is explained more.

As shown in FIG. 5(B), the auxiliary capacitance line driving signal Vcs assumes the high voltage level VcomH during the first charging time (time of $t_0$ to $t_1$). During the period $t_1$ to $t_2$, Vcs becomes VcomL. That is, during the time interval, $t_0$ to $t_2$, the voltage level Vcs on the auxiliary capacitance line 48 behaves in the same way as the voltage Vcom that applied to the counter electrode. Alternatively, Vcs may be floated during the period $t_1$ to $t_2$. However, during the period $t_2$ to $t_3$, a voltage Vcs2 that is lower than VcomH is applied on the auxiliary capacitance line. This generates effectively a larger voltage difference between the pixel electrode 13 and the counter electrode 14. After time $t_3$, the auxiliary capacitance line Vcs is floated until the next selection/charging period for that row arrives at time $t_5$ so that the thus created larger voltage difference at the pixel 15 is maintained until the next writing operation. Thus, Vcom and Vcs that are applied to the auxiliary capacitance line 48 and to the counter electrode 14, respectively, are both generally rectangular waves having a 50% duty with a pulse width corresponding to the pulse width of the scanning signal Vg. The selection/charging operation occurs during the HIGH period of the scanning signal Vg ($t_0$ to $t_1$). When the level of the Vcom and Vcs return to their respective LOW after the charging operation ($t_2$ to $t_3$), the level of Vcs is changed lower than the previous HIGH so that a greater voltage difference across liquid crystal is realized. Thereafter (after $t_3$), the auxiliary capacitance line Vcs is floated to maintain the larger voltage created across the liquid crystal at the pixel 15. Because the liquid crystal is being driven in the alternate current (AC) mode, the role of HIGH level and LOW levels for these signals are reversed in the next frame. Thus, in the next frame (corresponding to $t_5$ to $t_{10}$ in FIG. 5), the level of Vcs is raised by a preset amount during the period $t_7$ to $t_8$ from the VcomL.

It should be noted that the time in which the second voltage is applied is not limited to the half cycle but may generally be $(p+\frac{1}{2})$ cyclic period where p is 0 or a natural number. In the description that follows, it is assumed that the period of second voltage is applied to be the half cycle or period.

It should be noted that the time for the Vcs voltage to change to Vcs2 may not necessarily be a period defined by $t_2$ and $t_3$ (or $t_7$ and $t_8$), but can be at a later HIGH period (or LOW period for the next frame), such as $t_4$ to $t_5$ ($t_9$ to $t_{10}$). In other words, the voltage level of the second or any subsequent HIGH (LOW) period may be altered to be lower (higher) than the level HIGH that were used during the selection/charging period to effectively increase the voltage across the liquid crystal.

According to this embodiment, the peak-to-peak range of Vcs (VcomL to VcomH) need not be expanded. In the above example, the modification to the Vcs signal can be easily accommodated at auxiliary capacitance driving circuit 26 without a need for additional voltage source for a lower or higher voltage than the range VcomH to VcomL.

The operation of the driving scheme according to the present embodiment will be described in more detail. The capacitance (Clc) between the counter electrode 14 and the pixel electrode 13 is constant if the voltage dependence of the dielectric constant of the liquid crystal can be ignored. Moreover, the capacitance (Ccs) between the pixel electrode 13 and the auxiliary capacitance electrode 17 is also constant. Assume that the potential of the pixel electrode 13 is Vpix1 when the charging/writing of pixel 15 is completed. Further, assume that the potential of the counter electrode 14 during the charging is VcomW and the potential of the auxiliary capacitance electrode 17 during the charging is Vcs1. Then, the amount of electric charges Q accumulated at the pixel electrode 13 (Pix) during the charging operation is given by the following formula:

$$Q = Clc \times (Vpix1 - VcomW) + Ccs \times (Vpix1 - Vcs1).$$

Once the transistor 12 is turned off and the charging/writing operation is completed (e.g., at time $t_1$ in FIG. 5), the pixel electrode 13 is brought into a floating state. Then, the amount of electric charges accumulated at the pixel electrode 13 will be maintained until the next charging operation is commenced. In the conventional art, because Vcom and Vcs oscillate in the same way after this charging operation, the voltage level at eth pixel electrode 13 oscillates in the same way as that of Vcom and Vcs, thereby maintaining the amount of the charges at the pixel electrode 13. This yields a constant voltage difference across the liquid crystal cell during the holding period until the next writing/charging operation. Here, the period between the charging/writing operation the period in which the transistor 12 is turned off is referred to as the "holding period," since the charges are being held at the pixel electrode 13 that has been floated.

If the voltage on the auxiliary capacitance line Vcs is altered from the above-mentioned conventional art scheme, say, from Vcs1 to Vcs2, then because the amounts of the electric charge Q and the values of Clc and Ccs are constant, the voltage across the liquid crystal can be changed. In this case, the following formula is satisfied:

$$Q = Clc \times (Vpix1 - VcomW) + Ccs \times (Vpix1 - Vcs1)$$
$$= Clc \times (Vpix2 - VcomW) + Ccs \times (Vpix2 - Vcs2).$$

Therefore, the potential Vpix of the pixel electrode 13 is changed by:

$$Vpix2 - Vpix1 = Ccs/(Clc+Ccs) \times (Vcs2 - Vcs1).$$

Since the voltage applied to the liquid crystal is Vpix−Vcom, for the frame in which Vpix is larger than Vcom, the absolute value of Vpix−Vcom (|Vpix−Vcom|) is increased if Vcs2 is such that Vpix2−Vpix 1>0 (namely, Vcs2−Vcs1>0) (see the period $t_7$ to $t_8$ in FIG. 5). For the frame in which Vpix is lower than Vcom, the absolute value of the voltage across the liquid crystal is increased if Vcs2−Vcs1<0 (see the period $t_2$ to $t_3$, for example). If Vcs2<Vcs1, it drops. This is analogous in phenomenon to the charging pump used in the rise in pressure inside of an LSI but differs in that the voltage Vcom takes part. Thus, as described above, where Vcom oscillates as in the conventional art shown in FIG. 23, the present embodiment provides an effective and economical way to increase the voltages applied to the liquid crystal.

The Vcs of auxiliary capacitance electrode 17 is provided with Vcs1 (corresponding to Vcom) when the pixel electrode 13 is charged. However, for the next HIGH (or LOW) period $t_2$ to $t_3$ (or period $t_7$ to $t_8$), instead of returning to the same voltage, it is provided with a different voltage Vcs2. Thereafter, the auxiliary capacitance line is put in the floating state (i.e., high impedance at the corresponding terminal at the auxiliary capacitance driving circuit 26.) In such a mode of driving, the voltage across the liquid crystal (Vpix) can be effectively increased without a need to generate voltages beyond the voltage range determined by the voltage limit of driver LSIs. For example, when the voltage limit of driver LSIs is 4.8V, a voltage greater than 4.8V can be applied across the liquid crystal.

What becomes the key here is that in changing the voltage of the auxiliary capacitance electrode 17 from Vcs1 to Vcs2, the voltage Vcom is identical to that when the pixel 15 is charged. The fact that Vcs1 and Vcs2 is each a voltage (the difference from Vs is within 4.8 V) that can be supplied from the driver LSI can achieve this timing. The $(p+\frac{1}{2})$ cyclic period subsequent to the first cyclic period of the counter electrode driving signal (where p is 0 or a natural number) indicates the cyclic period with which this condition is satisfied.

Note that because the voltage on the auxiliary capacitance line Vcs is altered in this way, the auxiliary capacitance driving circuit 26 need not provide a voltage beyond the range of VcomL to VcomH. Technically, it should be possible to increase the voltage across the liquid crystal by changing the voltage level on the auxiliary capacitance driving line Vcs at a different timing, such as during the period $t_1$ to $t_2$. However, in such a case, the circuit 26 would need to generate a voltage beyond the range of VcomL to VcomH.

In this embodiment, a circuit operation is akin to a charging pump in which the potential on the auxiliary capacitance electrode 17 is varied to boost the pixel voltage. Since an auxiliary capacitance line 48 is provided separately from the counter electrode line, an appropriate voltage signal to effectively increase the voltage across the liquid crystal can be provided.

The auxiliary capacitance driving circuit 26 can be implemented as a separate LSI chip, or integrally formed on the same substrate in which the switching elements 12 are formed by use of thin film transistors made of amorphous silicon or polysilicon. In the case of the integral formation of the driving circuit, the wiring becomes simplified and the periphery of the liquid crystal display substrate can be made smaller.

Figure 6:
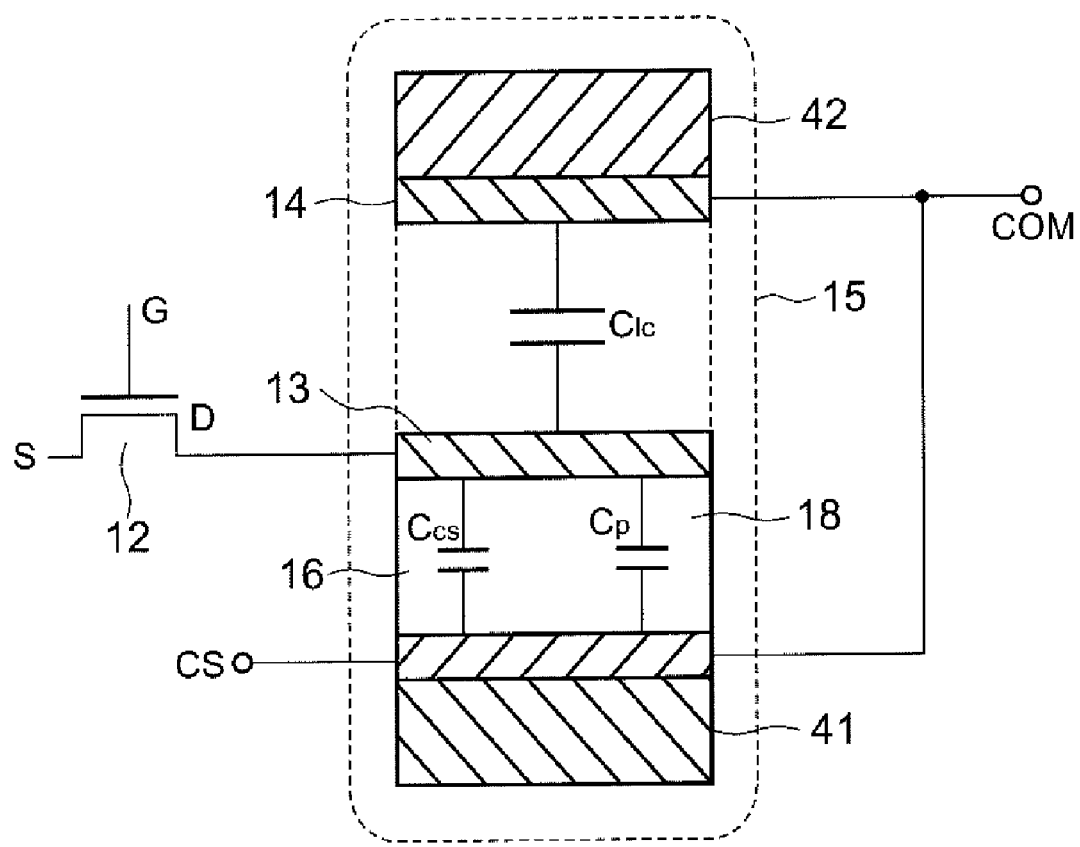
FIG. 6 is a block diagram illustrating an arrangement in which a pixel auxiliary capacitance and an auxiliary capacitance are separately provided according to an embodiment of the present invention.
Figure 7A:
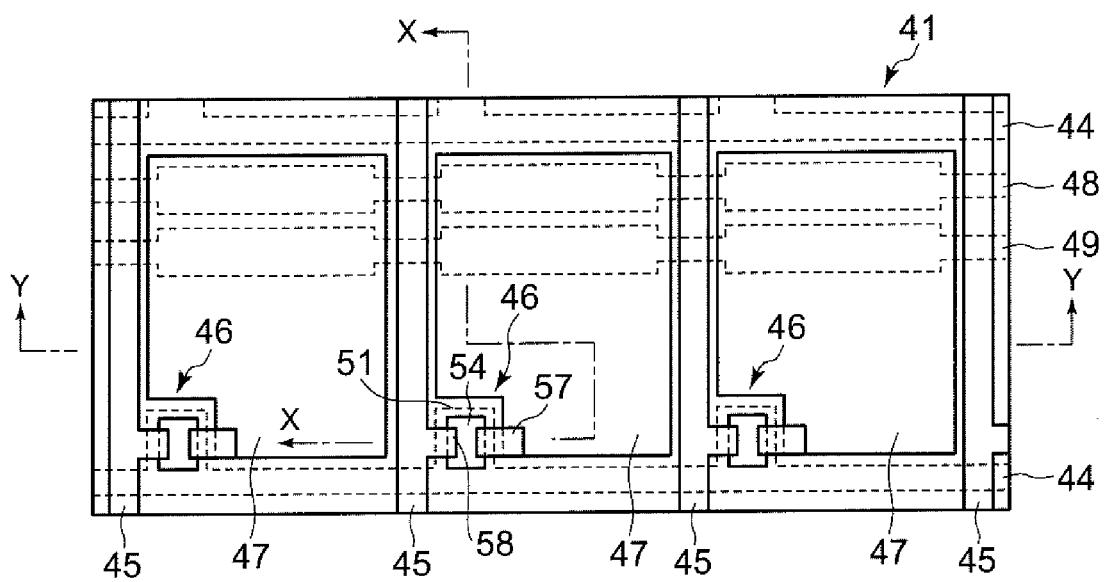
FIG. 7A is a plan view illustrating a pixel structure of an embodiment of FIG. 6.
Figure 7B:
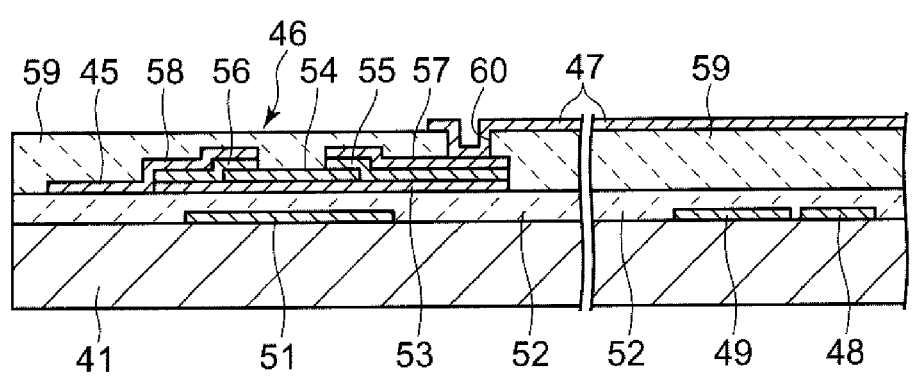
FIG. 7B is a cross sectional view thereof.

In the first form of implementation, the voltage on the auxiliary capacitance 16 is raised by changing the voltage applied to the auxiliary capacitance line 48. Thus, the same effect as above is also achieved in the identical prior-art makeup of pixel auxiliary capacitances by the addition of separate electrodes as auxiliary capacitances 16. FIGS. 6, 7A, and 7B show another embodiment of the present invention. FIG. 6 is a block diagram illustrating an arrangement in which the opposite electrode of an auxiliary capacitance is split into two and these two electrodes are controlled separately. FIGS. 7A and 7B show a specific pixel structure.

As shown in FIG. 6, the auxiliary capacitance is made of a first capacitance 16 and a second capacitance 18. In this structure, the first auxiliary capacitance 16 is referred to simply as auxiliary capacitance and the second auxiliary capacitance 18 as pixel auxiliary capacitance. The opposite electrode 17 forming the first auxiliary capacitance 16 is connected to terminal CS, and the opposite electrode forming the pixel auxiliary capacitance 18 is connected to COM (which is also connected to the counter electrode 14) so that they can be driven separately. The capacitance 16 and the pixel auxiliary capacitance 18 have their respective one ends commonly connected to the pixel electrode 13 and their other ends arranged separately of each other, i.e., connected to the auxiliary capacitance line driving circuit 26 and the counter electrode 14, respectively. In other words, the pixel auxiliary capacitance 18 is connected parallel to the pixel 15.

FIG. 7A is a plan view of the pixel structure and FIG. 7B is a cross sectional view thereof. As shown in the figures, in this embodiment, the opposite electrode (i.e. the auxiliary capacitance electrode 17) of the auxiliary capacitances 16 disposed at pixels 15 in each raw form an auxiliary capacitance line 48. The opposite electrode for the auxiliary capacitance 16 and the opposite electrode for the pixel auxiliary capacitance 18 are disposed in parallel to each other and in the row direction. An equivalent circuit of this configuration is the same as that described above. Because these patterns can be designed appropriately, a more freedom in terms of pattern design can be achieved, which is advantageous. For example, by appropriately designing the areas of these opposite electrodes 17 for the auxiliary capacitance 16 and pixel auxiliary capacitance 18, respectively, it is possible to provide for the effective amount of the storage capacitance necessary for holding the charges accumulated at the pixel electrode 13, and at the same time to provide for a sufficient capacitive coupling between the pixel electrode 13 and the auxiliary capacitance 16 to effectively increase the peak-to-peak voltage range applicable to the liquid crystal cell 15.

Figure 8:
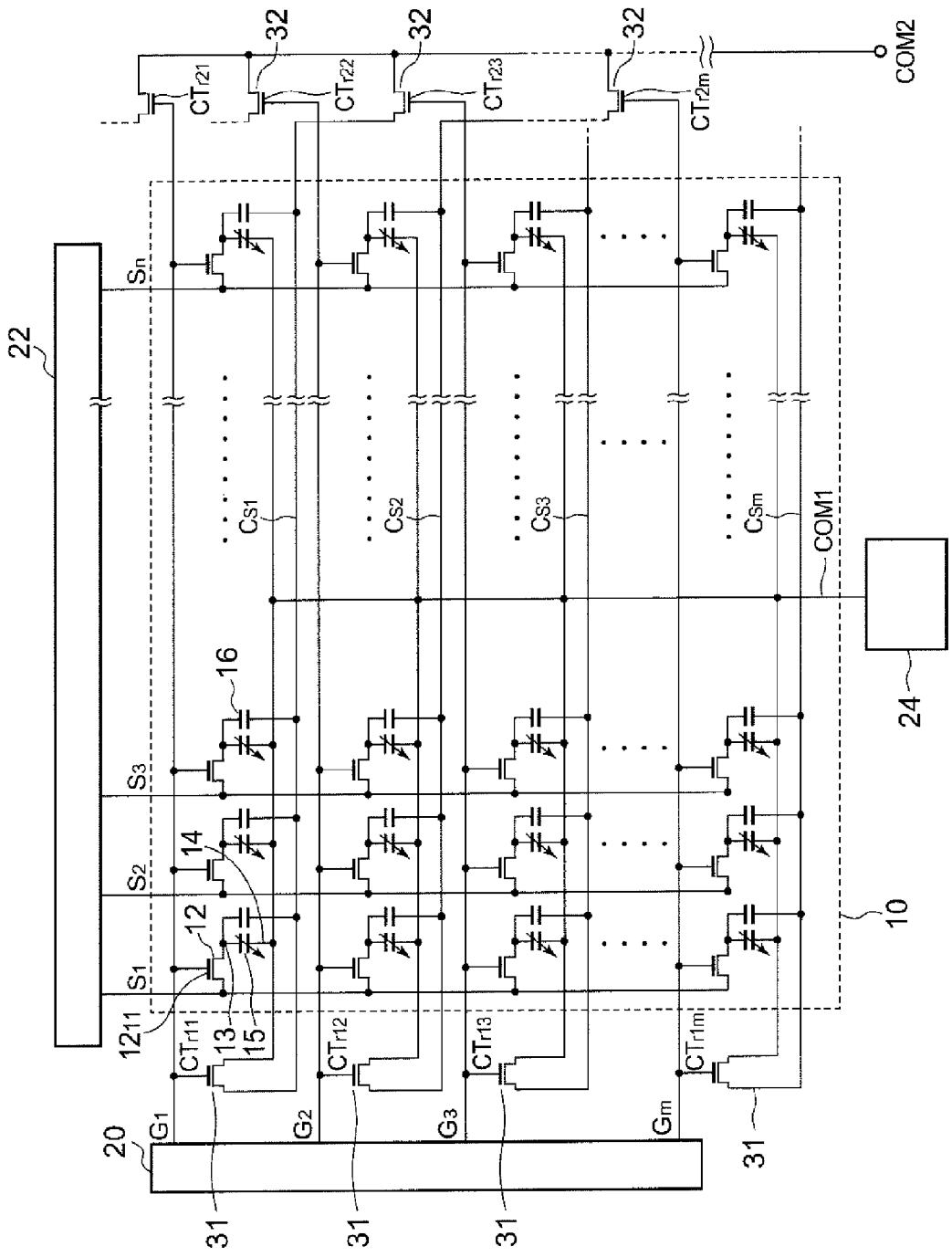
FIG. 8 is a block diagram illustrating a liquid crystal display device according to an embodiment of the present invention.

FIG. 8 is a block diagram illustrating another embodiment of the present invention. The auxiliary capacitance line driving circuit 26 here is made up to include first and second auxiliary capacitance driving transistors 31 and 32 connected to each of scanning lines ($G_1 \sim G_m$) to apply appropriate voltages on the opposite electrode 17 of the auxiliary capacitance 16. Pixel electrodes 13 of n in number connected to each scanning line of the scanning line driving circuit 20 are connected to one ends of auxiliary capacitances 16 of which the other ends are formed as a common electrode. Such common electrodes are provided which are by the number of scanning lines 44 of the scanning line driving circuit 20. The wiring consisting of the common electrode for the auxiliary capacitances 16 is referred to as "auxiliary capacitance line" 48 (Cs1~Csm). That is to say, such auxiliary capacitance lines 48 are separated one from another, each of which is driven by the first and second auxiliary capacitance driving transistors 31 and 32 provided at its both ends.

Here, such first auxiliary capacitance driving transistors 31, the m number of which as the number of the scanning lines as shown are arranged in a column along the scanning line driving circuit 20, are referred to as $CTr_{11} \sim CTr_{1m}$. Likewise, such second auxiliary capacitance driving transistors 32, the m number of which as the number of the scanning lines as shown are arranged along the n th column of switching elements 12, are referred to as $CTr_{21} \sim CTr_{2m}$.

The pixel electrode 13 is connected to the drain of the adjacent transistor 12. The counter electrode 14 that forms respective liquid crystal cells 15 together with the corresponding pixel electrodes 13 in one row is all connected to each other and is connected to the second main electrode of the first auxiliary capacitance driving transistor 31. The auxiliary capacitance electrodes 17 (opposite electrode) that form the respective auxiliary capacitances 16 together with the pixel electrodes 13 in the first row is all connected to each other and is connected to the first main electrode of the first auxiliary capacitance driving transistor 31. The each control electrode of the first auxiliary capacitance driving transistor 31 is connected to corresponding to each of scanning lines 44. Similarly, the second row of pixels and the third row of pixels are formed in the same way. And, the counter electrode 14 for the pixel auxiliary capacitance 18 are all connected to the counter electrode line (hereinafter called as COM1).

As shown in the figure, the second main electrode of the second auxiliary capacitance driving transistors 32 are all connected to second common electrode (hereinafter called as COM2). Similarly, the second row of pixels and the third row of pixels are formed in the same way. This way, the voltage on the counter electrode 14 (the opposite electrode forming the pixel capacitance 18) is always regulated by COM1. And, the voltage applied on the auxiliary capacitance lines Cs is controlled to the voltage level of COM2 by the switching condition of the associated first and second auxiliary capacitance driving transistors 31 and 32.

The first auxiliary capacitance driving transistor 31 of ith raw has a first main electrode connected to the auxiliary capacitances line 48 that is connected to other ends of the auxiliary capacitances 16 and a second main electrode connected to a counter electrode wiring (COM1) as a first common electrode and has a control electrode connected to an i th scanning line $G_i$.

The second auxiliary capacitance driving transistor 32 of i+2 th raw has a first main electrode connected to the first main electrode of the first auxiliary capacitance driving transistor of i th raw and to the auxiliary capacitances line 48 that is connected the other ends of the auxiliary capacitances 16 and a second main electrode connected to a second common electrode wiring (COM2) and has a control electrode connected to an (i+2) th scanning line ($G_{i+2}$). Thus, to control the n number of pixels 15 ($15_{11} \sim 15_{1n}$) in the first raw are used the first and second auxiliary capacitance driving transistors $CTr_{11}$ and $CTr_{23}$. Then, it follows that to control the voltages applied to the first row of pixels 15, the transistor $CTr_{11}$ and the transistor $CTr_{23}$ are involved. Similarly, in controlling the voltages applied to the i-th row of pixels, transistors $CTr_{1i}$ and the transistor $CTr_{2(i+2)}$ are involved.

To control the n number of pixels 15 in the (m−1)th raw are used the first auxiliary capacitance driving transistor $CTr_{1(m−1)}$ and the second auxiliary capacitance driving transistor $CTr_{21}$. To control the n number of pixels in the m th raw are used the first auxiliary capacitance driving transistor $CTr_{1m}$ and the second auxiliary capacitance driving transistor $CTr_{22}$.

The auxiliary capacitance line driving circuit 26 has the first and second auxiliary capacitance driving transistors 31 and 32 connected thereto for each scanning line. The second main electrode of the first auxiliary capacitance driving transistor 31 has the counter electrode wiring (COM1) connected thereto. The second main electrode of the second auxiliary capacitance driving circuit 32 is connected to the second common electrode wiring (COM2). For the 1st scanning line $G_1$, the control electrode of the first auxiliary capacitance driving transistor 31 is connected to the 1st scanning line $G_1$ and the control electrode of the second auxiliary capacitance driving transistor 32 is connected to the 3rd scanning line $G_3$.

Figure 9:
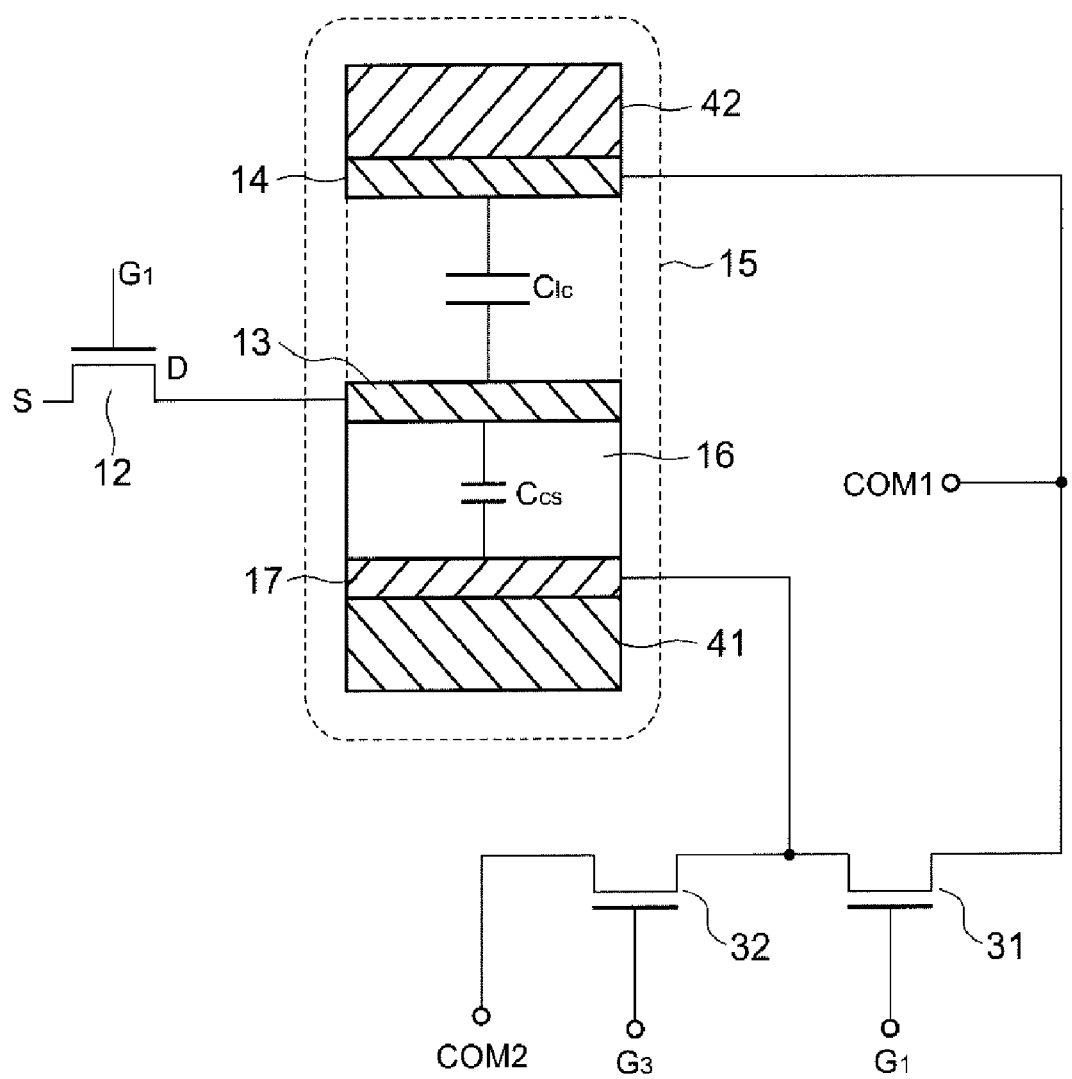
FIG. 9 is a diagrammatic view illustrating an equivalent circuit of a pixel according to the embodiment of FIG. 7.

The common electrode wiring (COM2) may have a voltage having an opposite polarity to that of the counter electrode wiring (COM1). In such a case, the COM driver 24 may be provided with a COM reversal signal forming circuit. An inverter circuit formed of thin film transistors and other circuit elements can be connected to the counter electrode driving circuit 24 and its output connected to the common electrode wiring (COM2) for this purpose. FIG. 9 illustrates an equivalent circuit of one pixel 15.

In FIG. 8, as in the above cases, scanning lines, $G_1$, $G_2$, $G_3$, ..., $G_m$ are successively selected. That is, the HIGH pulse signal is applied successively in the order of $G_1$, $G_2$, $G_3$, ..., $G_m$ for example, to turn on the transistors 12 line by line successively from the top. When the scanning line $G_1$ is selected, the switching elements 12 connected to the scanning line $G_1$ are turned on to charge the respective pixel electrodes 13 to respective voltages corresponding to the signals on the signal lines $S_1$, $S_2$, $S_3$, ..., $S_m$, respectively, thereby charging respective pixels 15 and auxiliary capacitances 16. During this selection/charging period, because the first auxiliary capacitance driving transistor $CTr_{11}$ is also turned on, the auxiliary capacitance line Cs1 in the first row receives voltage Vcom1 that is the same voltage applied to the counter electrode 14. Note that during this selection period, the second auxiliary capacitance driving transistor $CTr_{23}$ connected to the auxiliary capacitances line Cs1 in the first row is turned off because the scanning line $G_3$ has not been selected. Therefore, Vcom2 will not affect the voltage on the auxiliary capacitance electrodes 17 that forms the auxiliary capacitances 16. The voltage on the auxiliary capacitance electrodes 17 are controlled by Vcom1 through the first auxiliary capacitance driving transistor $CTr_{11}$.

When the selection/charging period for the scanning line $G_1$ is ended to non-selection period, and the scanning line $G_2$ is selected, the first and second auxiliary capacitance driving transistors $CTr_{11}$ and $CTr_{23}$ are both turned off because there is the LOW signal on their respective gates. Therefore, the auxiliary capacitance electrodes 17 and the pixel electrodes 13 are put in the floating condition, and the charges accumulated during the selection of the first row are maintained to hold the same voltage (COM1) thereon as on the counter electrode 14, thereby maintaining the same voltage differences across the respective liquid crystal cells 15 and across the auxiliary capacitances 16 regardless of how Vcom1 changes.

When the selection/charging of the scanning line $G_2$ is ended, and the scanning line $G_3$ is selected, the second auxiliary capacitance driving transistor $CTr_{23}$ is turned on because the HIGH single is on the scanning line $G_3$ that is connected to the gate of transistor $CTr_{23}$. As a result, the voltage Vcom2 on the COM2 line is applied to the auxiliary capacitance line Cs1 in the first row through the second auxiliary capacitance driving transistor $CTr_{23}$. The voltage (COM2) of the auxiliary capacitance line driving circuit (COM2) 26 is applied to the auxiliary capacitance electrode 17 through the second auxiliary capacitance driving transistor $CTr_{23}$. Then, the COM2 potential is different from the COM1 potential and the potential on the auxiliary capacitance lines Cs1 varies from COM1 to COM2. Therefore, at this time, the counter electrodes 14 of the liquid crystal cells 15 in the first row receive a voltage Vcom1 whereas the auxiliary capacitance lines Cs1 receives Vcom2. This change in potential expands the potential difference between the pixel electrode 13 and COM1 via the auxiliary capacitance line 48. Thus, the effect as in the charging pump raises the liquid crystal applied voltage. By appropriately selecting the polarity and the amount of the voltage difference between Vcom1 and Vcom2, the voltages across the respective liquid crystal cells can be effectively increased as in the cases explained above with reference to FIG. 5.

After the selection of scanning line $G_3$ ends, the voltages across the respective liquid crystal cells are maintained and held at a constant value until the next selection in the next frame that has been increased in the manner described above. This is so because during this holding time, both the first and second auxiliary capacitance driving transistors $CTr_{11}$ and $CTr_{23}$ are turned off. Thus, the charge charged by writing COM2 has been held on the auxiliary capacitance line 48 and this effect allows the pixel voltage on the scanning line $G_1$ to be kept rising. The voltage rising on the pixel 15 is maintained in the state that a potential difference from COM1 is created. This is because the auxiliary capacitance lines 48 (Cs1, Cs2~Csm) are in floating state.

Figure 10:
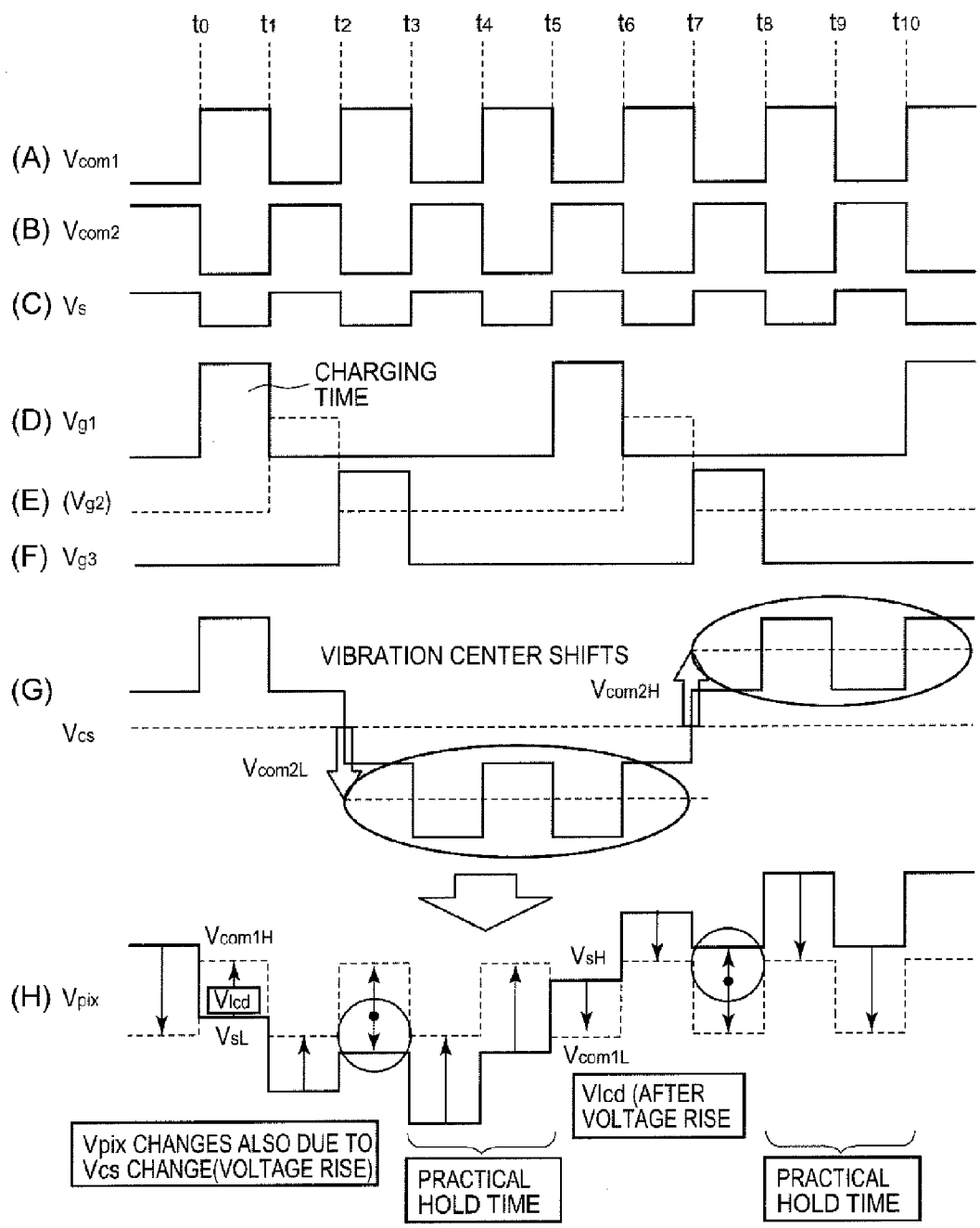
FIG. 10 depicts an example of a set of waveforms for driving a liquid crystal display device of the present embodiment, in which (A) shows a counter electrode driving signal, (B) shows a second common electrode driving signal (Vcom2), (C) shows a signal line driving signal, (D) shows a driving signal for a scanning line $G_1$, (E) shows a driving signal for a scanning line $G_2$, (F) shows a driving signal for a scanning line $G_3$, (G) shows the voltage at an auxiliary capacitance line/electrode in the first row, and (H) shows the voltage at the pixel electrode at the corresponding pixel and the voltage difference across the liquid crystal cell between the pixel electrode and the counter electrode.

FIG. 10 shows an example of a set of waveforms for driving a liquid crystal display device of the present embodiment, in which (A) shows a counter electrode driving signal, (B) shows a second common electrode driving signal (Vcom2), (C) shows a signal line driving signal, (D) shows a driving signal for a scanning line $G_1$, (E) shows a driving signal for a scanning line $G_2$, (F) shows a driving signal for a scanning line $G_3$, (G) shows the voltage at an auxiliary capacitance line/electrode in the first row, and (H) shows the voltage at the pixel electrode 13 at the corresponding pixel 15 and the voltage difference across the liquid crystal cell 15 between the pixel electrode 13 and the counter electrode 14.

As shown in (A) and (B) in FIG. 10, the counter electrode driving signal (Vcom1) is a rectangular wave and the second common electrode driving signal (Vcom2) is a signal opposite in phase to the counter electrode driving signal (Vcom1). As shown in FIG. 10(C), the signal line driving signal is a rectangular wave opposite in phase to the counter electrode driving signal.

As shown in FIGS. 10(D) to 10(F), the scanning line driving signal is a rectangular wave having a HIGH level for the selection/charging period. Specifically, the scanning line driving signal $G_1$ periodically assumes a HIGH level amplitude in the selection/charging period (e.g., in period $t_0$ to $t_1$ and period $t_5$ to $t_6$) and takes a LOW level at all other times. Likewise, the scanning line driving signal $G_2$ has a HIGH level amplitude in period $t_1$ to $t_2$ and in period $t_6$ to $t_7$, and assumes a LOW level at other times. The scanning line driving signal $G_3$ has a HIGH level amplitude in period $t_2$ to $t_3$ and in period $t_7$ to $t_8$, and assumes a LOW level at other times. The time interval during which the scanning line driving signal is in its LOW state is referred to as the "holding time".

FIG. 10(G) shows a waveform of the voltage applied to the auxiliary capacitance electrode 17 for the auxiliary capacitances 16. When the scanning line driving signal $G_1$ is HIGH ($t_0$ to $t_1$), the first auxiliary capacitance driving transistor 31 is rendered conductive whereby Vcom1 is applied to the auxiliary capacitance electrode 17 during that time. When the scanning line driving signal $G_3$ is ON ($t_2$ to $t_3$), the second auxiliary capacitance driving transistor 32 is rendered conductive whereby Vcom2 is applied to the auxiliary capacitance electrode 17 at this time. Other than these times, such as the period $t_3$ to $t_5$, the first and second auxiliary capacitance driving transistors 31 and 32 remain nonconductive, and the auxiliary capacitance electrode 17 that is placed opposite to the pixel electrode 13 is put in the floating state. With such a driving signal, the potential (Vcs) of the auxiliary capacitance electrode 17 assumes a waveform having its signal center rising and falling down alternately for each of the cyclic periods of the scanning line driving signal. Because of this, for the technical reasons similar to that discussed above, the voltage applied across the liquid crystal cell at the pixel 15 can be effectively increased.

FIG. 10(H) shows a waveform of the voltage applied to the pixel electrode 13 of the pixel 15 as well as the voltage difference applied across the corresponding liquid crystal pixel 15. As shown in the figure, in time $t_2$ to $t_3$, the voltage drop on the auxiliary capacitance line/electrode 48 causes the waveform on the pixel electrode 13 to change, effectively increasing the voltage amplitude applied across the liquid crystal cell 15. In the period $t_3$ to $t_5$, the thus raised voltage across the liquid crystal cell 15 is maintained. Thus, using the above-explained scheme and structure, the potential difference in absolute value between the pixel electrode 13 and the counter electrode 14 can be increased.

In this embodiment, scanning signals from the scanning line driving circuit 26 are used as the respective control signals for the first and second auxiliary capacitance driving transistors 31 and 32. The voltage (Vcom1) supplied to the main electrode of the first auxiliary capacitance driving transistor 31 was supplied from the counter electrode driving circuit 24. Here, the voltage Vcom2 supplied to the and second auxiliary capacitance driving transistor 32 can be an inverted signal that is inverted from the output of the counter electrode driving circuit 24. Therefore, in this example, the auxiliary capacitance line driving circuit 26 can be simplified. In such a case, additional wiring/circuitry need not be provided in or external to the TFT substrate. Therefore, additional LSIs or circuitry are not needed.

Many variations and modifications are possible for the waveform and the values of the Vcom1 and Vcom2. In this embodiment, a signal for driving the auxiliary capacitance line/electrode is used as Vcom inverting signal. For example, a DC voltage (VcomDC) that corresponds to the oscillation center of Vcom1 may be used. In such a case, the generation and supply of the Vcom2 is further simplified. Of course, the amplitude may be reduced while maintaining the timing of inverting Vcom and its amplitude center intact. The state that the amplitude is 0 is the minimum and this is VcomDC. Furthermore, the amplitudes of Vcom2 shown in FIG. 10 may be changed to a smaller value than that shown in (B) in FIG. 10. Various other modifications for Vcom2 are possible as long as the voltage and timing of Vcom2 are such that it effectively increases the voltage across the corresponding liquid crystal cell.

Figure 11:
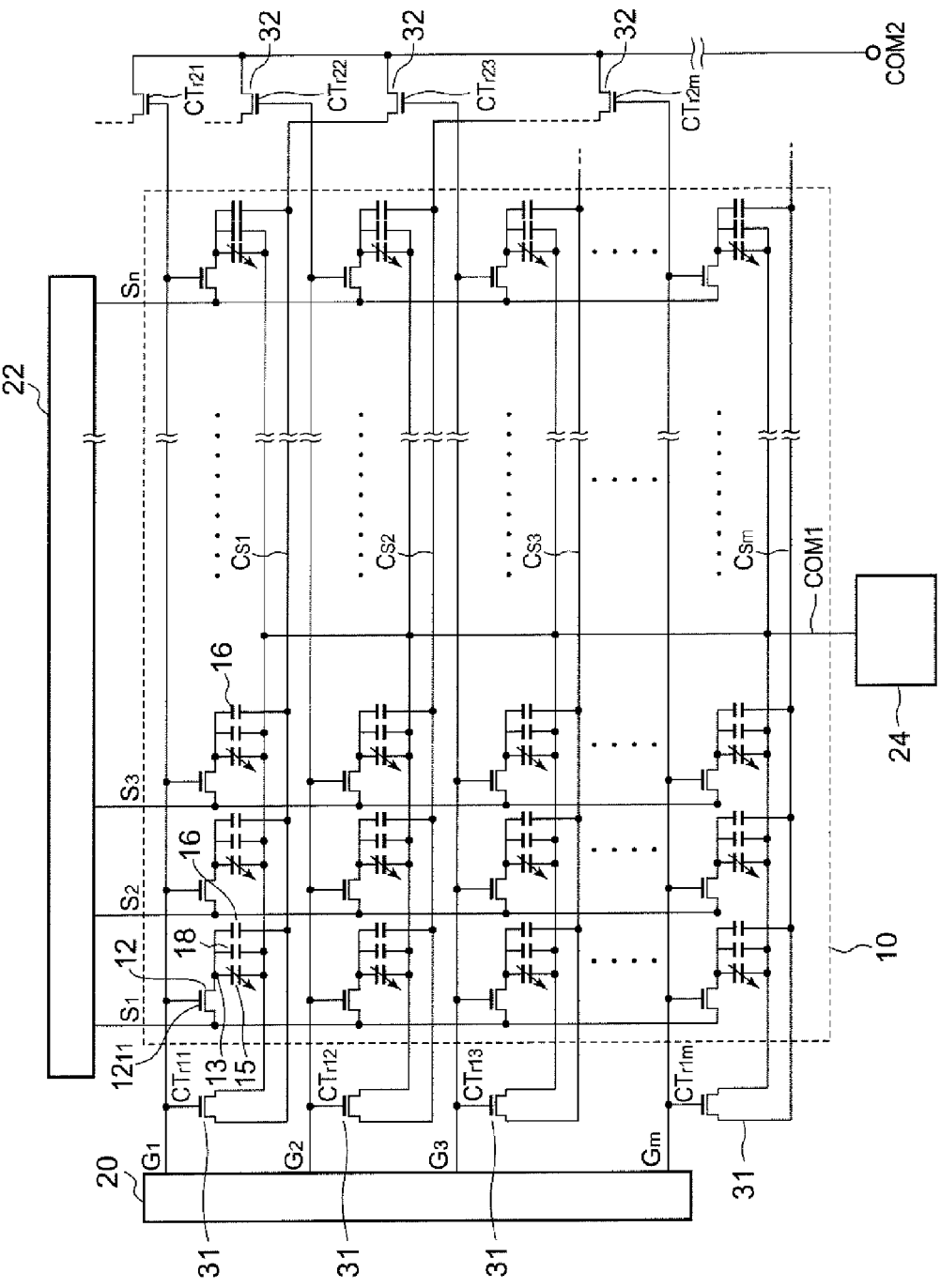
FIG. 11 is a block diagram of the device in cases where a pixel auxiliary capacitance and an auxiliary capacitance are separately provided.
Figure 12:
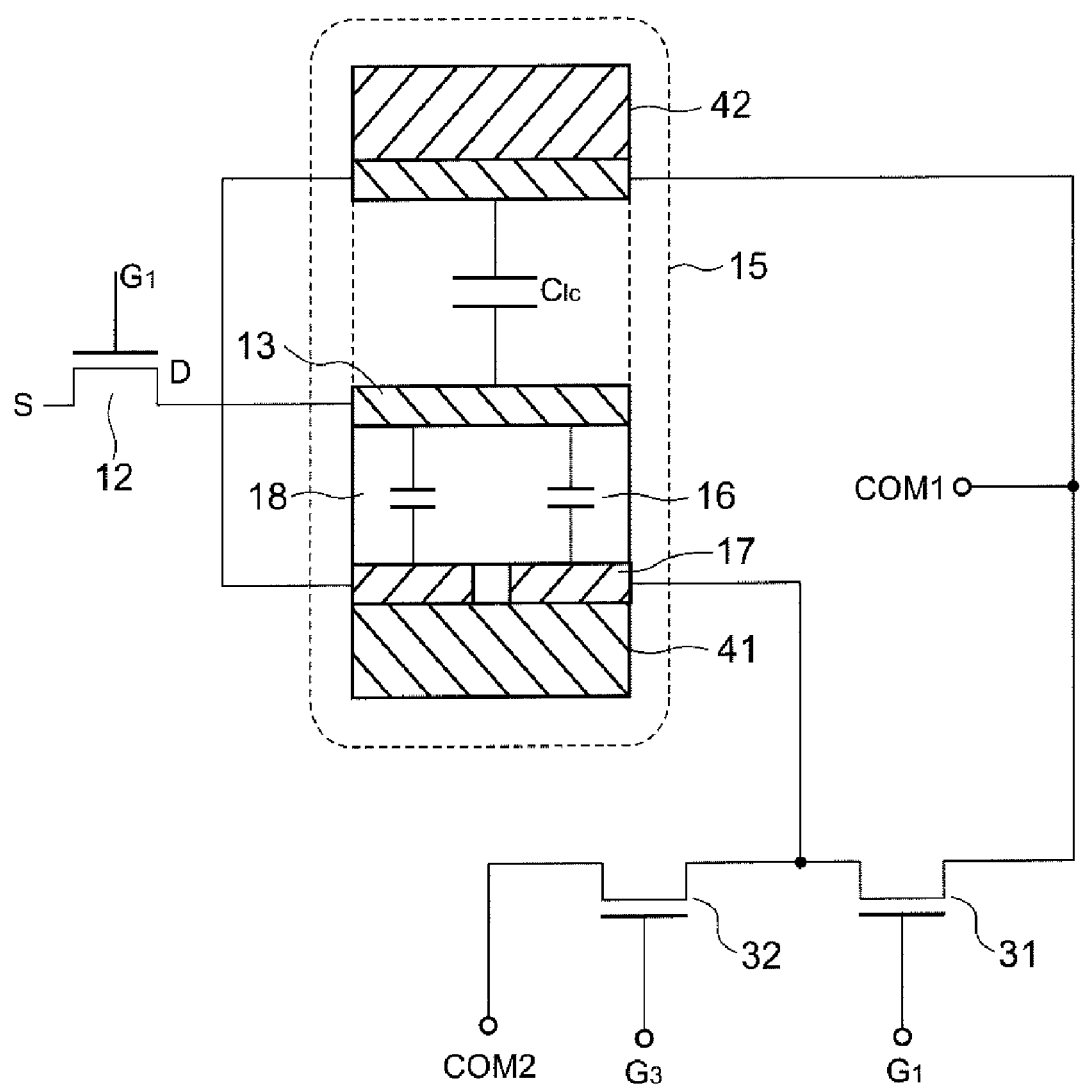

In this embodiment, as in the cases of the above embodiment shown in FIGS. 6 and 7, the pixel auxiliary capacitance (Cp) 18 can be connected in parallel with the auxiliary capacitance (Cs) 16 formed of liquid crystal pixel. Such an example is shown in FIG. 11. FIG. 11 is a block diagram illustrating the device in case a pixel auxiliary capacitance 18 and an auxiliary capacitance 16 are separately provided and FIG. 12 schematically illustrates an exemplary specific pixel structure. As shown in FIG. 11, one ends of the pixel auxiliary capacitance 18 and the auxiliary capacitance 16 are commonly connected to the pixel electrode 13, and auxiliary capacitance electrodes 17 are provided which are connected to the other ends of the pixel auxiliary capacitance 18 and the auxiliary capacitance 16, respectively. As illustrated, the other end of the pixel auxiliary capacitance 18 is connected to the counter electrode 14 while the other end of the auxiliary capacitance electrode 17 is connected to the auxiliary capacitance line driving circuit 26.

As shown in FIGS. 11 and 12, the structure of each pixel concerning the auxiliary capacitances 16 and the pixel auxiliary capacitances 18 for liquid crystal are similar to those shown in FIGS. 6 and 7. As in the above example, this auxiliary capacitance line 48 that is separately controlled can be arranged parallel to the capacitance line that is connected to the counter electrode 14 of the pixel auxiliary capacitance 18. This provides a significant convenience for pattern designing. Because these patterns of the opposite electrodes for the capacitances can be designed appropriately, a more freedom in terms of pattern design can be achieved, which is advantageous. For example, by appropriately designing the areas of these opposite electrodes for the capacitances 16 and 18, respectively, it is possible to provide for the effective amount of the storage capacitance necessary for holding the charges accumulated at the pixel electrode 13, and at the same time to provide for a sufficient capacitive coupling between the pixel electrode 13 and the auxiliary capacitance electrode 17 to effectively increase the peak-to-peak voltage range applicable to the liquid crystal cell 15.

Here, the auxiliary capacitance line driving circuit 26 can be provided adjacent to the display part 10. As in the case of FIGS. 2 and 3, the auxiliary capacitance line driving circuit 26 can be formed on the first transparent substrate 41 using amorphous silicon or polysilicon.

Figure 13:
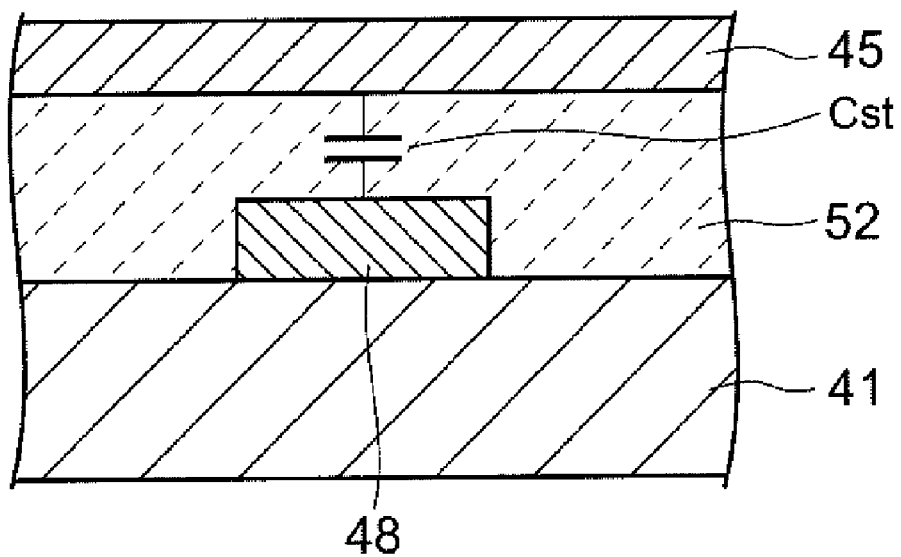
FIG. 13 is diagrammatic cross sectional view illustrating a parasitic capacitance created at an intersection of a signal line and an auxiliary capacitance line for a pixel shown in FIG. 2.

In the above-mentioned examples of the liquid crystal display devices 1, 30, each auxiliary capacitance line 48 intersects with signal lines 45. FIG. 13 is a diagrammatic cross sectional view illustrating an intersection of a signal line 45 and an auxiliary capacitance line 48 of the pixel shown in FIG. 2. In FIG. 13 which is a cross sectional view taken along the line A-A in FIG. 2, parasitic capacitance Cst is formed in each intersection of the auxiliary capacitance line 48 and the signal line 45.

Figure 14:
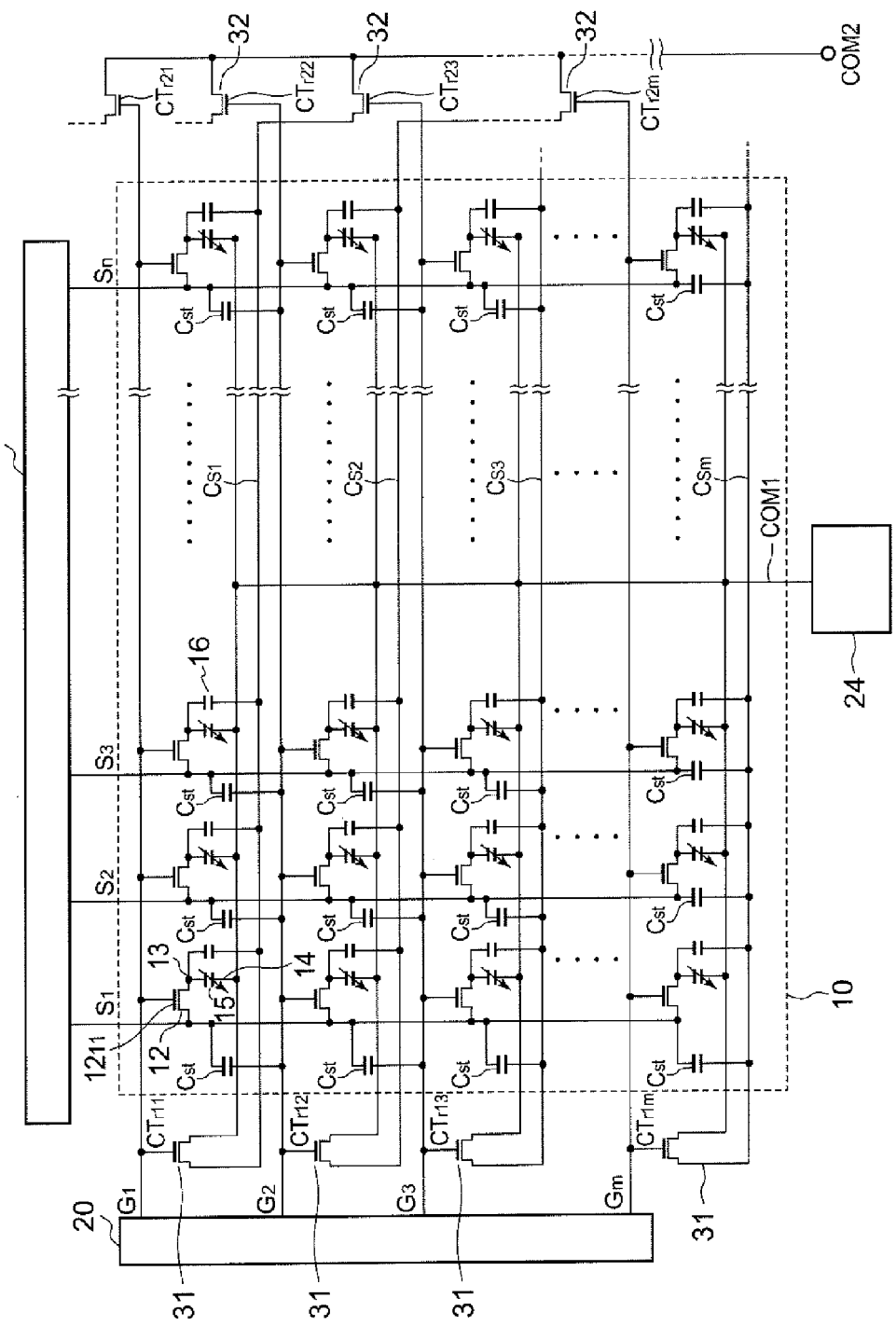
FIG. 14 is a block diagram of a liquid crystal display device 30 including a parasitic capacitances Cst.

FIG. 14 is an equivalent circuit diagram of the above example including the parasitic capacitances Cst. As shown in FIG. 14, with the parasitic capacitance Cst formed at the intersection of the auxiliary capacitance line 48 and the signal line 45, the auxiliary capacitance line 48 in its floating state has a composite capacitance which is equal to C (the parasitic capacitance for each intersection)×n (the number of the signal lines). Accordingly, the auxiliary capacitance line 48 has its potential varied as affected by an average potential on the signal lines 45 via the composite capacitance Cn. The potential variation on the auxiliary capacitance line 48 brings about a change in the amount of the voltage elevation effect in the row of the pixels connected to the auxiliary capacitance line 48. Therefore, the pixel voltage is affected by the signal line potentials (i.e., the image data) that are imposed on the other rows.

Mention is next made of a modification of the pixel of the liquid crystal display device 1, 30 that can shield such a parasitic capacitance produced at the intersection of the signal line 45 and the auxiliary capacitance line 48.

Figure 15:
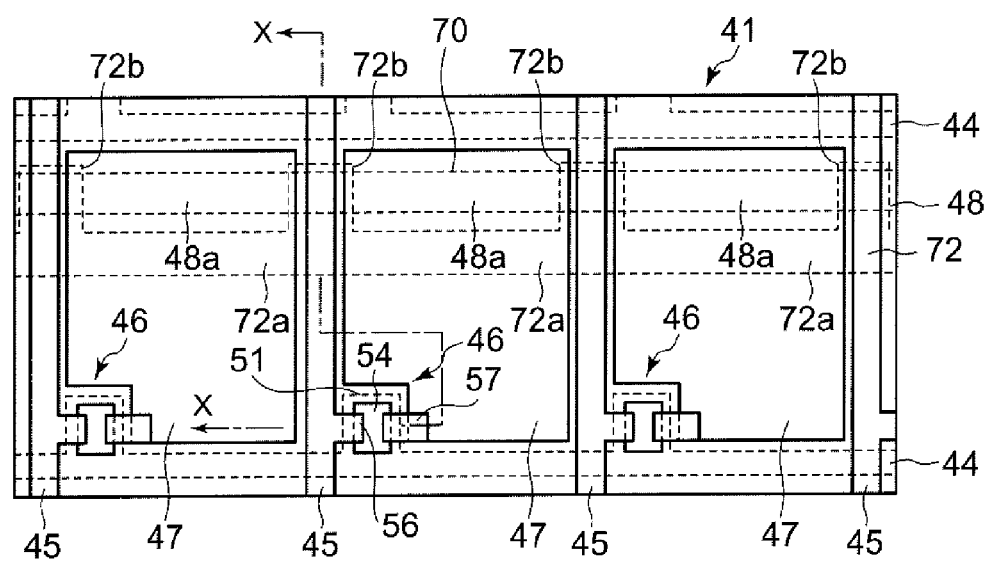
FIG. 15 is a partial transparent plan view illustrating the makeup of a modification of a pixel structure according to an embodiment of the present invention.
Figure 16:
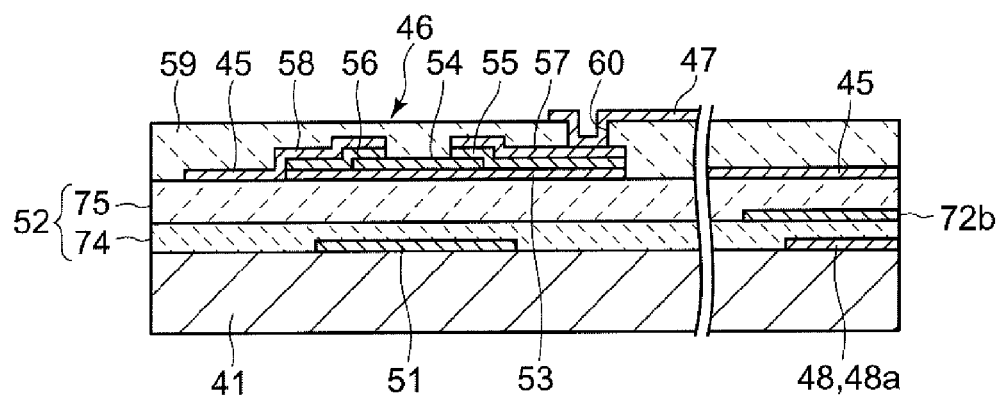
FIG. 16 is a cross sectional view taken along the line X-X in FIG. 16.

FIG. 15 is a plan view of an embodiment of the present invention illustrating an example of such a modification of the pixel structure, and FIG. 16 is a cross sectional view taken along the line X-X in FIG. 15.

As shown in FIG. 15, the pixel 70 is provided with a parasitic capacitance shield wiring 72 for shielding the parasitic capacitance Cst produced between the signal line 45 and the auxiliary capacitance line 48. As shown in FIG. 15, the parasitic capacitance shield wiring 72 has a linear part 72a and protruding part 72b. The linear part 72a is disposed in parallel with the auxiliary capacitance electrode 48a. The protruding part 72b extends into the intersection between the auxiliary capacitance line 48 and the signal line 45. Consequently, the parasitic capacitance shield wiring 72 is arranged so that its protruding parts 72b is interposed between the signal line 45 and the auxiliary capacitance line 48 at each and every intersection of these lines. It should be noted here that the protruding part 72b which is provided at the intersection of the signal line 45 and the auxiliary capacitance line 48 may simply be referred to as the intersection.

As shown in FIG. 16, at the pixel 70, the gate insulating film 52 formed on the first substrate 41 of the liquid crystal display device 1 as shown in FIGS. 2 and 3 has a two-layer structure made of a first gate insulating film 74 and a second gate insulating film 75. The parasitic capacitance shield wiring 72 is formed onto the first gate insulating film 74. Forming the auxiliary capacitance line 48 on the first substrate 41 provides the same structure as in the liquid crystal display device 1.

The auxiliary capacitance line 48 and the signal line 45 are formed on the second gate insulating film 75 as similar manner in the liquid crystal display device 1 as shown in FIGS. 2 and 3. The parasitic capacitance shield wirings 72 of the number m are formed corresponding to auxiliary capacitance lines Cs1, Cs2~Csm shown in FIG. 1.

Figure 17:
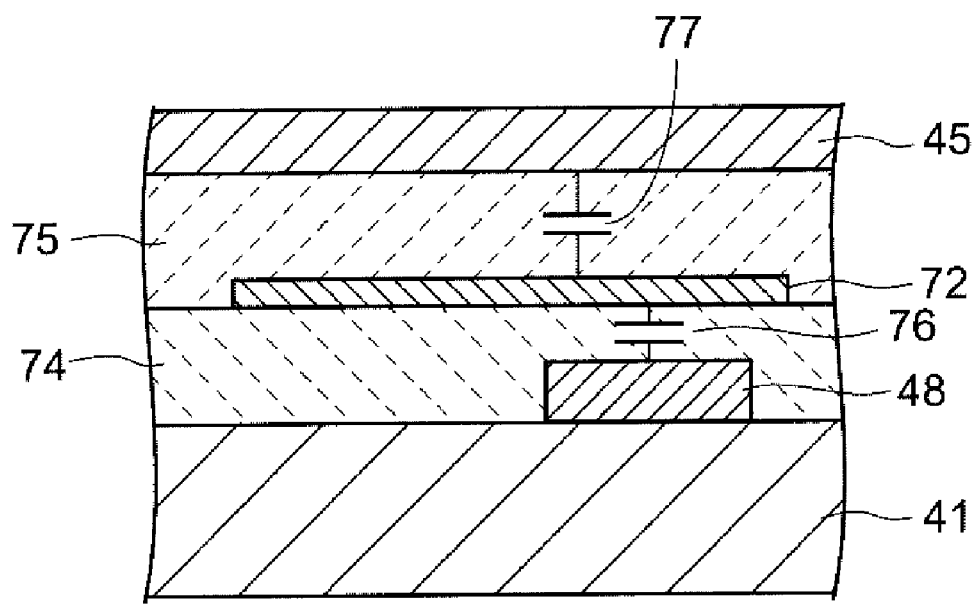
FIG. 17 is a diagrammatic cross sectional view schematically illustrating capacitances created at the intersection of the signal line and the auxiliary capacitance line due to the addition of the parasitic capacitance shield wiring.

FIG. 17 is a cross sectional view schematically illustrating capacitances created at the intersection of the signal line 45 and the auxiliary capacitance line 48 due to the addition of the parasitic capacitance shield wiring 72. As shown, since the auxiliary capacitance line 48 and the electrode of the parasitic capacitance shield wiring 72 are juxtaposed with each other across the first gate insulating film 74, a first intersection capacitance 76 develops between the auxiliary capacitance line 48 and the parasitic capacitance shield wiring electrode 72. Further, since the parasitic capacitance shield wiring 72 and the signal line 45 are juxtaposed with each other across the second gate insulating film 75, a second intersection capacitance 77 develops between the parasitic capacitance shield wiring 72 and the signal line 45.

In the spacing between the auxiliary capacitance line 48 and the signal line 45, the first and second intersection capacitances 76 and 77 are thus formed between the parasitic capacitance shield wiring 72 and the former of them on the one hand and the latter of them on the other hand, respectively, but no parasitic capacitance is formed which can directly couple the auxiliary capacitance line 48 and the signal line 45.

Thus, each row has one parasitic capacitance shield wiring 72, and a plurality of these shield wirings 72 are disposed corresponding to the number of rows. These parasitic capacitance shield wirings 72 can be connected to each other and may be given with a common potential. The common potential applied commonly to all the parasitic capacitance shield wirings 72 can be a fixed constant potential, such as GND, for example. The parasitic capacitance shield wirings 72 are preferably composed of a metal which has a low resistivity in order to prevent a voltage signal delay as the common potential is being applied.

Therefore, the adverse effects of the parasitic capacitance between the auxiliary capacitance line 48 and the signal line 45 are substantially eliminated. Thus, the voltage elevation effect of pixel 70 discussed above utilizing the floating state of the auxiliary capacitance lines 48 (Cs1, Cs2, . . . , Csm) at some point in operation can be stably performed without adverse influences from the time varying voltages on the intersecting signal lines 45.

While the potential on the parasitic capacitance shield wiring 72 for the pixel 70 can be a fixed voltage such as GND, it can also be a voltage (COM1) applied to the counter electrode 14. In this case, a capacitance is formed in an area where the parasitic capacitance shield wiring 72 and the pixel electrode 47 overlap to each other. This capacitance is effective for further stabilizing a potential applied to the liquid crystal cell at the pixel 70 as an additional auxiliary capacitance.

The pixel 70 can be fabricated by the following manufacture method. A metallic layer is deposited on a first substrate 41 and patterned to form a gate electrode 51 and an auxiliary capacitance line 48. The metallic layer used may be chromium, chromium alloy, aluminum, aluminum alloy, molybdenum, etc., or any combination thereof.

Next, a first gate insulating film 74 of a given thickness is deposited so as to cover the entire surface of the first substrate 41 formed with the patterns of the gate electrode 51 and the auxiliary capacitance line 48. The first gate insulating film 74 is composed of an insulating material such as silicon nitride or silicon oxide.

Next, a metallic layer is formed on the first gate insulating film 74 and patterned to form a parasitic capacitance shield wiring 72. The parasitic capacitance shield wiring 72 can be composed of the same material as that for the gate electrode 51 and the auxiliary capacitance line 48.

Next, a second gate insulating film 75 of a given thickness is deposited on the entire surface of the first gate insulating film 74 on which a pattern of the parasitic capacitance shield wiring 72 is formed. The second gate insulating film 75 can be composed of an insulating material such as silicon nitride or silicon oxide. In particular, it may be formed of the same material as the first insulating film 74. From this process step on, the steps mentioned for the liquid crystal display device 1 in connection with FIG. 2 may likewise be performed.

Figure 18:
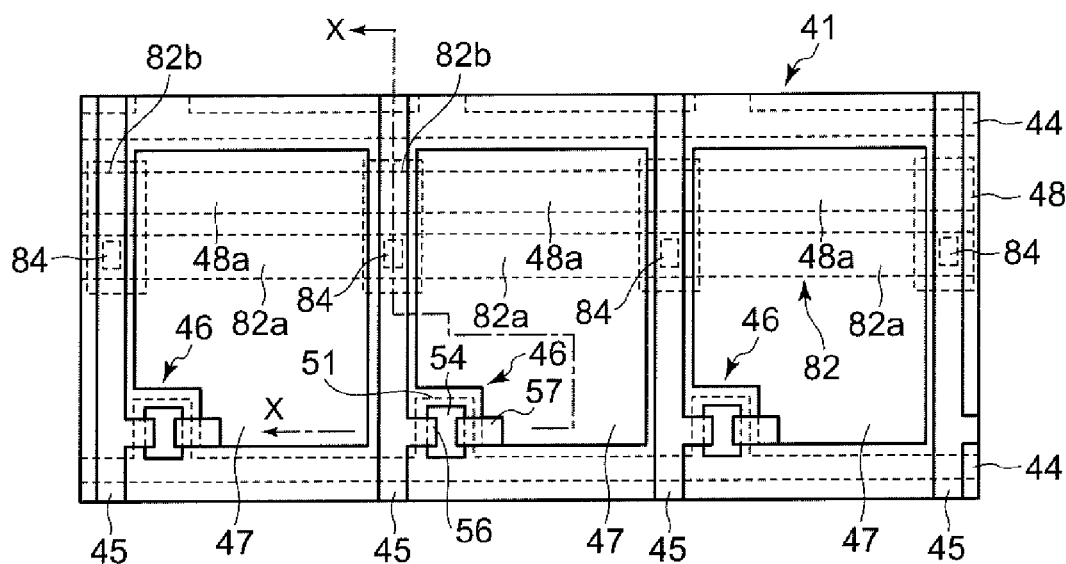
FIG. 18 is a partial transparent plan view illustrating the makeup of a pixel structure according to an embodiment of the present invention.
Figure 19:
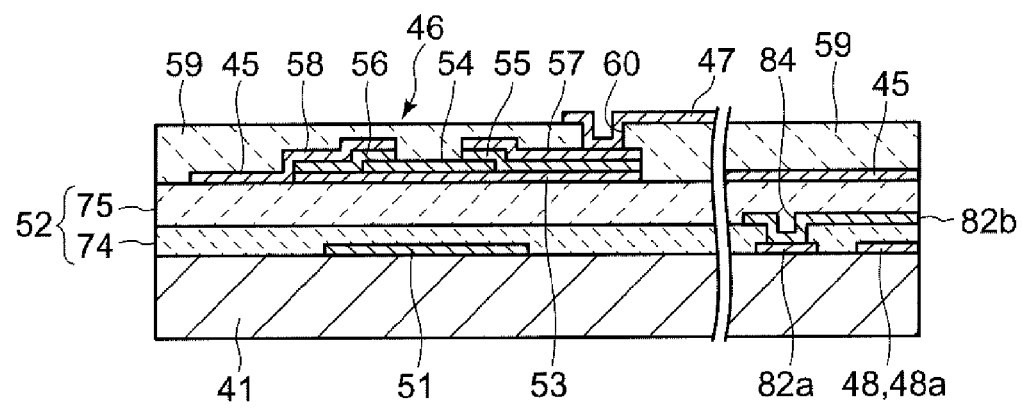
FIG. 19 is a cross sectional view taken along the line X-X in FIG. 18.

Mention is next made of still another embodiment for a pixel 80 that can be used for the liquid crystal display device 1, 30. FIG. 18 is a plan view illustrating the makeup of a pixel 80 and FIG. 19 is a cross sectional view taken along the line X-X in FIG. 18 according to this embodiment.

As shown in the figure, the pixel 80 has a parasitic capacitance shield wiring 82 which comprises a linear part 82a arranged parallel to the auxiliary capacitance line 48 on the first substrate 41, and a protruding part 82b arranged in an area where the auxiliary capacitance line 48 and the signal line 45 intersect with each other. The first gate insulating film 74 is provided with a contact hole 84 to expose the linear part 82a of the parasitic capacitance shield wiring 82. The protruding part 82b of the parasitic capacitance shield wiring is formed on the second gate insulating film 75 so as to be connected to the linear part 82a of the parasitic capacitance shield wiring 82 via the contact hole 84.

Figure 20:
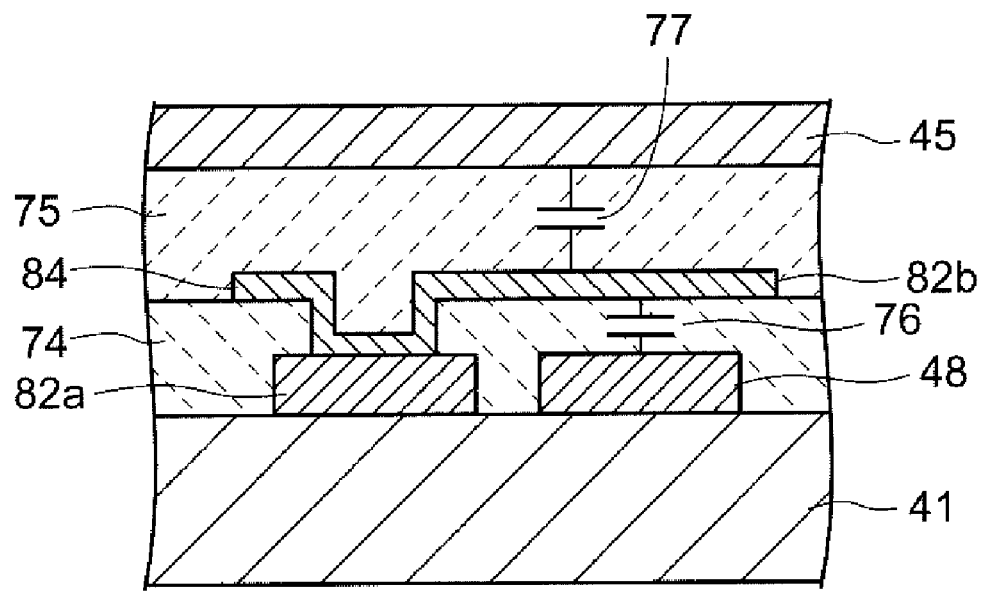
FIG. 20 is a diagrammatic cross sectional view illustrating a capacitance created at an intersection of a parasitic capacitance shielding line and a signal line for a pixel.
Figure 21:
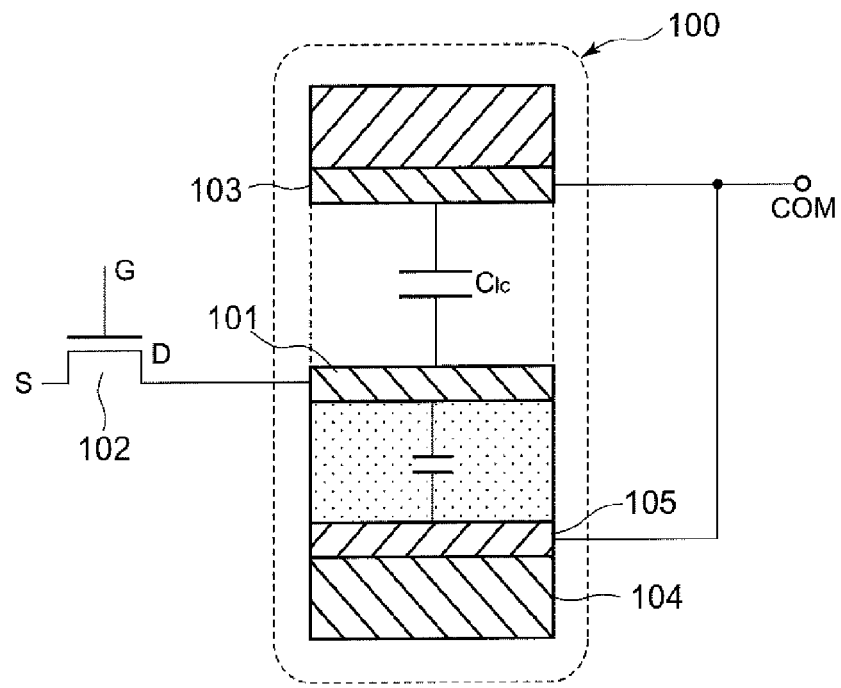
FIG. 21 is a diagrammatic view illustrating the structure of a pixel in a conventional liquid crystal display device.
Figure 22:
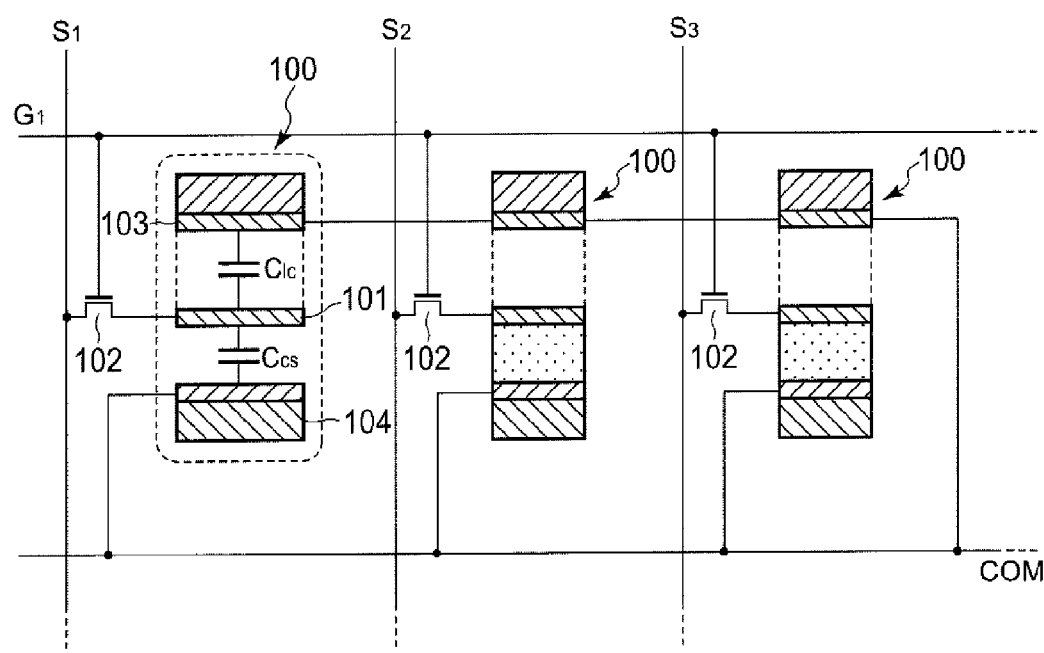
FIG. 22 is a diagrammatic view illustrating the structure of a row of pixels in the conventional art.

FIG. 20 is a diagrammatic cross sectional view illustrating capacitances created at the intersection of the parasitic capacitance shield wiring 82 and the signal line 45 for the pixel 80.

As shown in the figure, since the auxiliary capacitance line 48 and the protruding part 82b of the parasitic capacitance shield wiring 82 are juxtaposed with each other across the first gate insulating film 74, a first intersection capacitance 76 develops between the auxiliary capacitance line 48 and the protruding part 82b of the parasitic capacitance shield wiring. Further, since the protruding part 82b of the parasitic capacitance shield wiring and the signal line 45 are juxtaposed with each other across the second gate insulating film 75, a second intersection capacitance 77 develops between the protruding part 72b of the parasitic capacitance shield wiring and the signal line 45.

In the spacing between the auxiliary capacitance line 48 and the signal line 45, the first and second intersection capacitances 76 and 77 are thus formed between the parasitic capacitance shield wiring 82 and the former of them on the one hand and the latter of them on the other hand, respectively, but parasitic capacitance Cst is in no way formed which can directly couple the auxiliary capacitance line 48 and the signal line 45. Since the protruding part 82b of the parasitic capacitance shield wiring is connected to the linear part 82a of the parasitic capacitance shield wiring via the contact hole 84, the linear part 82a effectively shields the auxiliary capacitance line 48 so that the adverse influences from the time varying signals on the signal line 45 are substantially eliminated.

While in FIG. 18 the contact hole 84 is shown as formed in a portion where the signal line 45 and the parasitic capacitance shield wiring 82 overlap, this is not a necessary condition. It can be formed at any position as desired if on the parasitic capacitance shield wiring 82.

As in the case of the above embodiment, the parasitic capacitance shield wiring 82 can be given with a fixed potential such as GND or the voltage Vcom1 that is applied to the counter electrode 14. As for the pixel 80, too, it is thus possible to stably maintain its voltage rising state since the auxiliary capacitance line if provided with the parasitic capacitance shield wiring 82 is no longer affected by a change in potential of the signal line $S_1, S_2, S_3, \ldots, S_n$.

As in the above example, when the same potential as that to the counter common electrode 14 is applied to the parasitic capacitance shield wiring 82, an additional auxiliary capacitance is effectively formed, thereby improving the stability of the potential across the liquid crystal cell at each pixel 80 during the holding time.

The pixel 80 of this embodiment as shown in FIG. 18 can be fabricated as stated below.

Patterns of an auxiliary capacitance line 48 and a linear part 82a of parasitic capacitance shield wiring are formed on a first substrate 41 using the same conductive material having a low resistance. Next, a first gate insulating film 74 is deposited to a given thickness and a contact hole 84 is formed in the first insulating film 74 at a position above the linear part 82a.

Next, an electrode layer to constitute a protruding part 82b of parasitic capacitance shield wiring is deposited to a given thickness and is patterned to form the linear part 82a of parasitic capacitance shield wiring. In contrast to the parasitic capacitance shield wiring 72 of pixel 70 as shown in FIG. 14, the protruding part 82b of parasitic capacitance shield wiring need not be composed of a low resistivity metal in order to prevent a voltage signal delay. It may be made of a transparent conductive film such as ITO as long as the linear part 82a has a sufficiently low resistivity. Therefore, the aperture ratio can be improved as compared with the above embodiment.

Next, a second gate insulating film 75 of a given thickness is deposited on the entire surface of the first gate insulating film 75. From this process step on, the steps mentioned for the liquid crystal display device in connection with FIG. 2 may likewise be performed.

With the liquid crystal display device 1, 30 according to the above-described various aspects of the present invention, it is possible to drive auxiliary capacitances 16 by an auxiliary capacitance line driving circuit 26 of a simple makeup, and to maintain the elevated state of pixel voltage (Vpix) across the liquid crystal cell 15 during its holding period, thereby providing a superior pixel contrast. The pixel voltage can effectively be raised while using the voltage within the voltage restriction of a driver LSI or circuitry used in the liquid crystal display device 1, 30.

According to a liquid crystal display device 1, 30 and its driving method as described above, the auxiliary capacitance 16 at each pixel 15 can be driven by an auxiliary capacitance driving circuit 26 separately from a counter electrode 14, and by utilized various aspects of the present invention as described above, an effective increase in the pixel voltage applied to the liquid crystal cell 15 can be achieved in a simple construction and an improvement in pixel contrast results without raising the output voltage of a driver's LSI. Also, the auxiliary capacitance driving circuit 26 can be implemented at a low cost.

Figure 23:
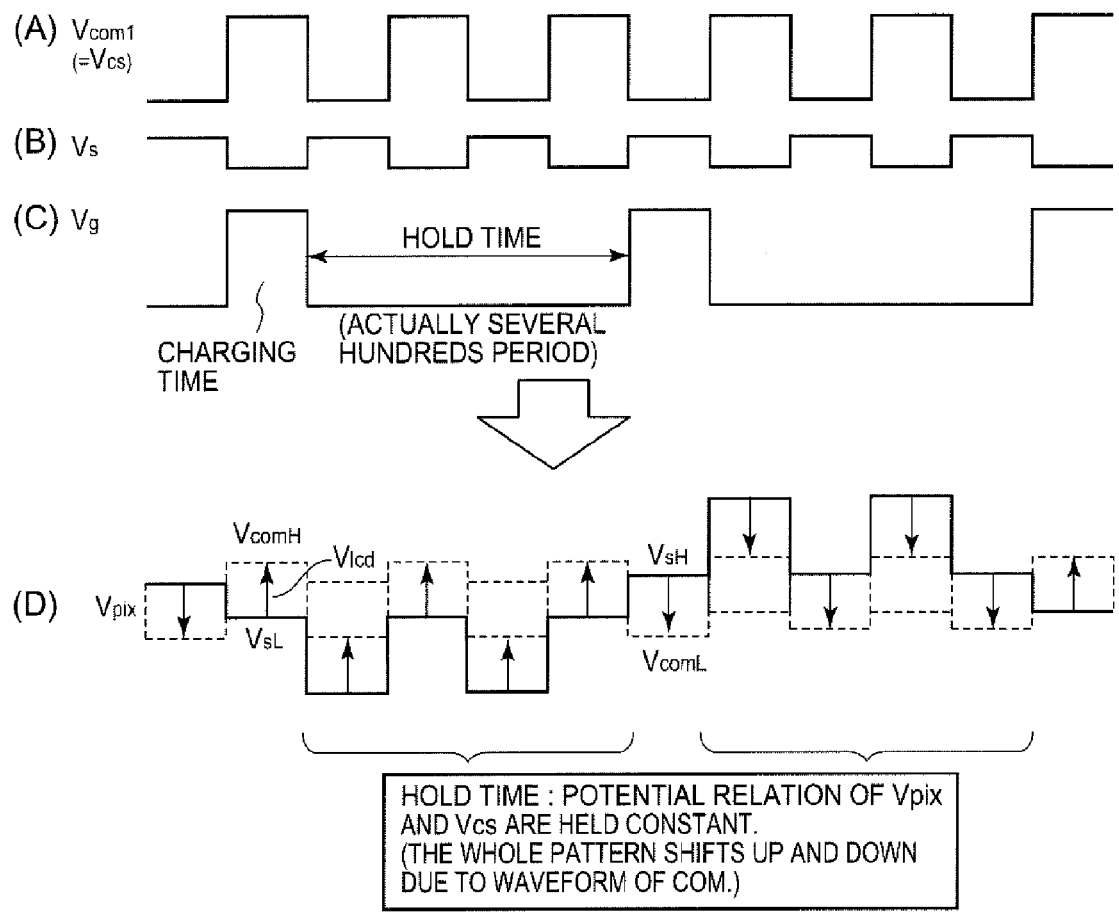
FIG. 23 shows waveforms applied to a pixel.
Figure 24:
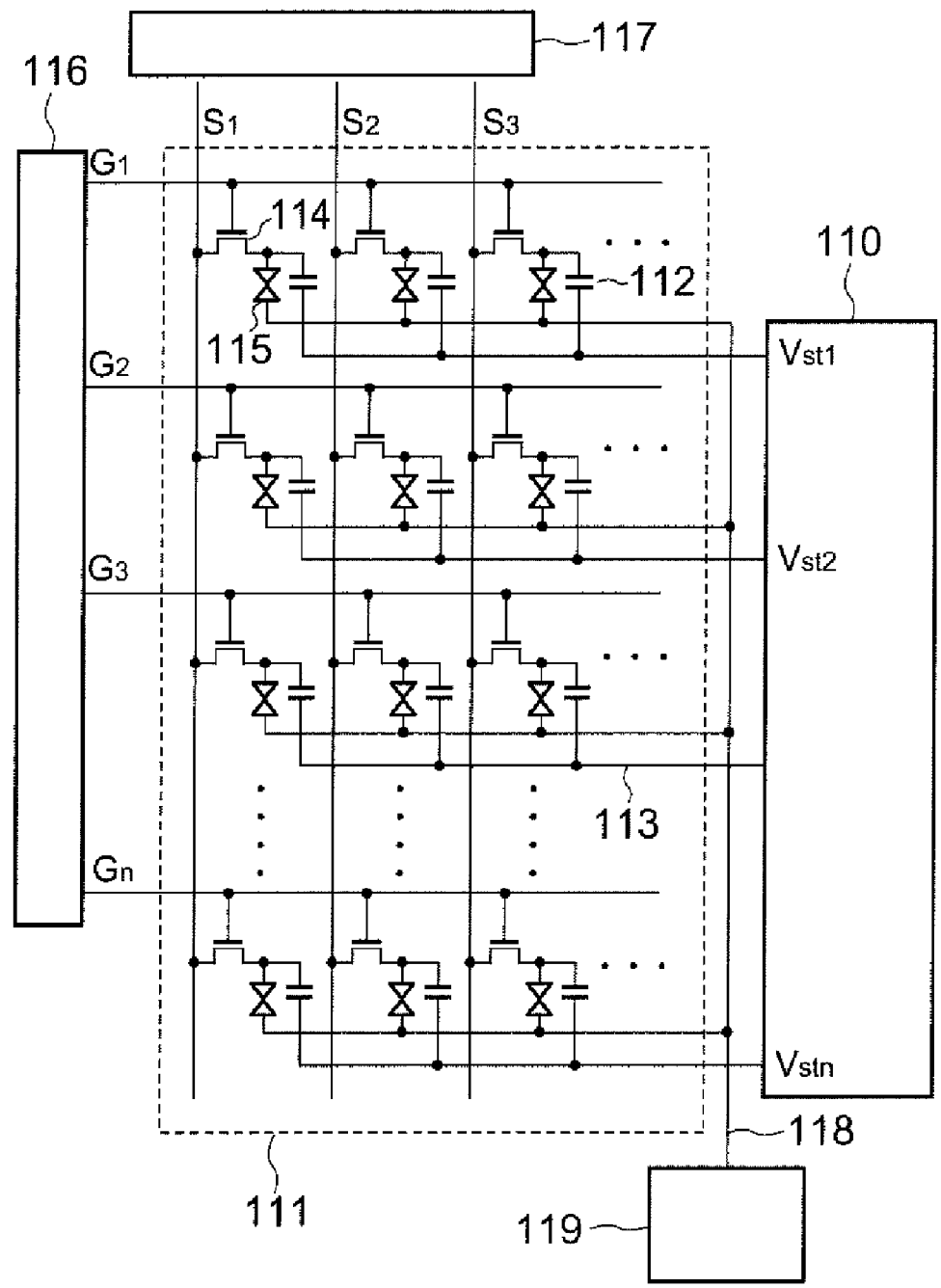
FIG. 24 is a block diagram illustrating a liquid crystal display device of the conventional art.
Figure 25:
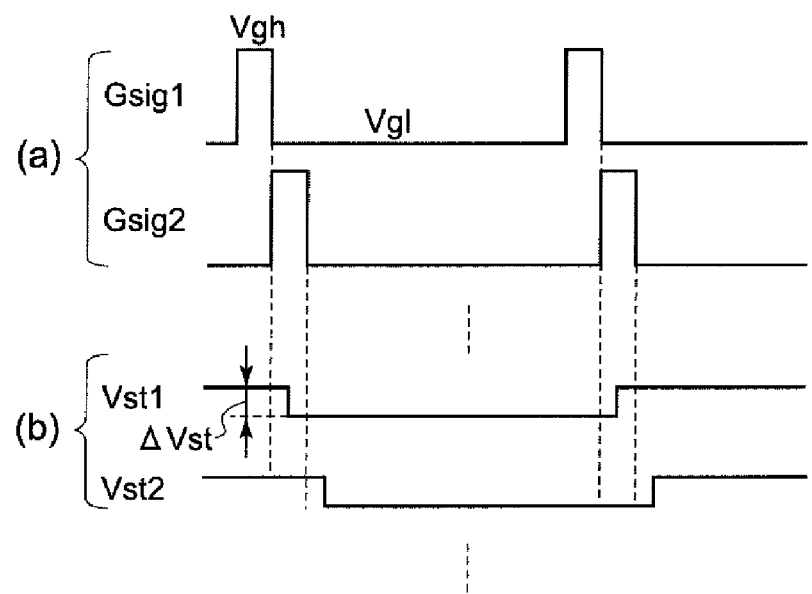
FIG. 25 depicts timing diagrams illustrating an operation of the liquid crystal display device of the conventional art, in which (A) shows a gate signal output from scanning lines and (B) shows voltage signals on auxiliary capacitance line.
Figure 26:
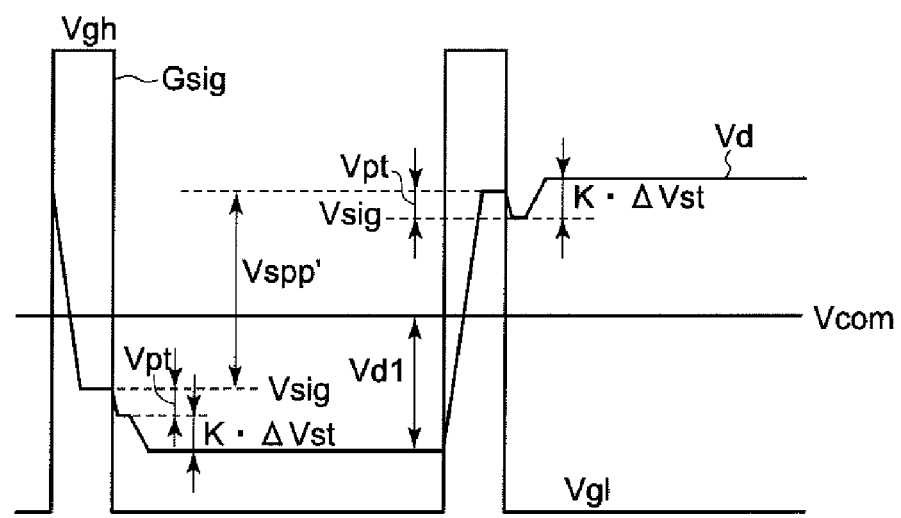
FIG. 26 depicts a waveform of a voltage signal applied to each pixel in the liquid crystal display device of the conventional art.

It should be noted that in the above explanations of FIGS. 5, 10, and 23, the parasitic capacitance between the gate and the drain of the transistors 12 are not explicitly described. However, it goes without saying that a small amount of the voltage drop due to such a parasitic capacitance, as in Vpt in FIG. 25, should actually be taken into account in determining the appropriate levels of the driving waveforms.

It will be apparent to those skilled in the art that various modification and variations can be made in the LCD driving method and LCD apparatus of the present invention without departing from the spirit or scope of the invention. Thus, it is intended that the present invention cover modifications and variations that come within the scope of the appended claims and their equivalents.

What is claimed is:

1. A liquid crystal display device comprising:
   a display part comprising:
   a plurality of scanning lines arranged in rows, the rows being numbered from the top consecutively starting with 1 and ending with m,
   a plurality of signal lines arranged in columns, the columns being numbered from the left consecutively staring with 1 and ending with n,
   switching elements disposed at respective intersections of said scanning lines and said signal lines,
   a pixel electrode connected to an output end of the respective switching element,
   counter electrodes capacitively coupled with the respective pixel electrodes,
   liquid crystal cells disposed between said pixel electrodes and said counter electrodes, thereby defining a matrix of m rows and n columns of pixels,
   an auxiliary capacitance whose one end is connected to an output end of each of said switching elements, and
   a plurality of auxiliary capacitance lines arranged in rows, each of the auxiliary capacitance lines being connected to a corresponding row of the auxiliary capacitances;
   a scanning line driving circuit for providing each row of said scanning lines with a scanning line driving signal having an on time and a holding time in which the switching element in each row can be turned on and off, respectively;

a signal line driving circuit for providing a signal line driving signal for each column of said signal lines;

a counter electrode driving circuit for providing said counter electrodes with a counter electrode driving signal having a set frequency and a set cycle; and an auxiliary capacitance line driving circuit for providing an auxiliary capacitance line driving signal for each row of said auxiliary capacitance lines, wherein said auxiliary capacitance line driving circuit is adapted to apply a first voltage to the auxiliary capacitance lines in a first half cycle of said counter electrode driving signal during the on time of said scanning line driving signal and apply a second voltage in a (p+½)th cycle after said first half period of said counter electrode driving signal where p is 0 or a natural number, said auxiliary capacitance line driving circuit making the auxiliary capacitance line in a floating condition after said (p+½)th cycle during the remaining holding time.

2. A liquid crystal display device as set forth in claim 1 wherein:

said auxiliary capacitance line driving circuit comprises a first driving transistor and a second driving transistor connected to a respective one of said auxiliary capacitance lines, said first driving transistor has a first main electrode connected to the other end of said auxiliary capacitance, said first driving transistor has a second main electrode connected to a counter electrode wiring (COM1) as a first common electrode, said first driving transistor has a control electrode connected to an ith row scanning line (Gi), said second driving transistor has a first main electrode connected to the first main electrode of said first driving transistor, said second driving transistor has a second main electrode connected to a second common electrode wiring (COM2), and said second driving transistor has a control electrode connected to an (i+2) th scanning line ($G_{i+2}$).

3. A liquid crystal display device as set forth in claim 1, wherein said auxiliary capacitance comprises a first auxiliary capacitance and a second auxiliary capacitance each of which has one end connected to said pixel electrode, and the other end of said first auxiliary capacitance is connected to said auxiliary capacitance line driving circuit while the other end of said second auxiliary capacitance is connected to each of said counter electrodes.

4. A liquid crystal display device as set forth in claim 1, wherein said display part is provided with a first substrate and a second substrate, wherein said scanning lines and said signal lines are formed on said first substrate while said counter electrodes are formed on said second substrate.

5. A liquid crystal display device as set forth in claim 4, wherein said auxiliary capacitance has a wiring formed on said first substrate, an insulating film formed on said wiring and a transparent electrode formed on said insulating film.

6. A liquid crystal display device as set forth in claim 1, wherein said auxiliary capacitance line driving circuit is disposed adjacent to said display part, and said auxiliary capacitance line driving circuit comprises a thin film transistor using amorphous silicon or polysilicon.

7. A liquid crystal display device comprising:

a display part comprising:

a plurality of scanning lines arranged in rows, the rows being numbered from the top consecutively starting with 1 and ending with m, a plurality of signal lines arranged in columns, the columns being numbered from the left consecutively staring with 1 and ending with n, switching elements disposed at respective intersections of said scanning lines and said signal lines, a pixel electrode connected to an output end of the respective switching element, counter electrodes capacitively coupled with the respective pixel electrodes, liquid crystal cells disposed between said pixel electrodes and said counter electrodes, thereby defining a matrix of m rows and n columns of pixels, an auxiliary capacitance whose one end is connected to an output end of each of said switching elements, and a plurality of auxiliary capacitance lines arranged in rows, each of the auxiliary capacitance lines being connected to a corresponding row of the auxiliary capacitances;

a scanning line driving circuit for providing each row of said scanning lines with a scanning line driving signal having an on time and a holding time in which the switching element in each row can be turned on and off, respectively;

a signal line driving circuit for providing a signal line driving signal for each column of said signal lines;

a counter electrode driving circuit for providing said counter electrodes with a counter electrode driving signal having a set frequency and a set cycle; and an auxiliary capacitance line driving circuit for providing an auxiliary capacitance line driving signal for each row of said auxiliary capacitance lines, wherein said auxiliary capacitance line driving circuit comprises a first driving transistor and a second driving transistor connected to each of said auxiliary capacitance lines, said first driving transistor has a first main electrode connected to the other end of said auxiliary capacitance, said first driving transistor has a second main electrode connected to a counter electrode wiring (COM1) as a first common electrode, said first driving transistor has a control electrode connected to an i th row scanning line (Gi), said second driving transistor has a first main electrode connected to the first main electrode of said first driving transistor, said second driving transistor has a second main electrode connected to a second common electrode wiring (COM2), and said second driving transistor has a control electrode connected to an (i+2) th scanning line ($G_{i+2}$), and wherein said auxiliary capacitance line driving circuit is adapted to apply a first voltage to the auxiliary capacitance lines in a first half cycle of said counter electrode driving signal during the on time of said scanning line driving signal and apply a second voltage in a (p+½)th cycle after said first half cycle of said counter electrode driving signal where p is 0 or a natural number said auxiliary capacitance line making the auxiliary capacitance line in a floating condition after said (p+½)th cycle during the remaining holding time.

8. A liquid crystal display device as set forth in claim 7, wherein said auxiliary capacitance comprises a first auxiliary capacitance and a second auxiliary capacitance each of which has one end connected to said pixel electrode, and the other end of said first auxiliary capacitance is connected to said auxiliary capacitance line driving circuit while the other end of said second auxiliary capacitance is connected to each of said counter electrodes.

9. A liquid crystal display device as set forth in claim 7, wherein said display part and said auxiliary capacitance line driving circuit are provided with a first substrate and a second substrate, said scanning lines and said signal lines are formed on said first substrate while said counter electrodes are formed on said second substrate.

10. A liquid crystal display device as set forth in claim 9, wherein said auxiliary capacitance has a wiring formed on said first substrate, an insulating film formed on said wiring and a transparent electrode formed on said insulating film.

11. A liquid crystal display device as set forth in claim 7, wherein said auxiliary capacitance line driving circuit is disposed adjacent to said display part, and said auxiliary capacitance line driving circuit comprises a thin film transistor using amorphous silicon or polysilicon.

12. A method of driving a liquid crystal display device, said liquid crystal device comprising a display part that includes:
a plurality of scanning lines arranged in rows, the rows being numbered from the top consecutively starting with 1 and ending with m,
a plurality of signal lines arranged in columns, the columns being numbered from the left consecutively staring with 1 and ending with n,
switching elements disposed at respective intersections of said scanning lines and said signal lines,
a pixel electrode connected to an output end of the respective switching element,
counter electrodes capacitively coupled with the respective pixel electrodes,
liquid crystal cells disposed between said pixel electrodes and said counter electrodes, thereby defining a matrix of m rows and n columns of pixels,
an auxiliary capacitance whose one end is connected to an output end of each of said switching elements, and
a plurality of auxiliary capacitance lines arranged in rows, each of the auxiliary capacitance lines being connected to a corresponding row of the auxiliary capacitances,
the method comprising the steps of:
providing each row of said scanning lines a scanning line driving signal having an on time and a holding time in which the switching element in each row can be turned on and off, respectively;
providing a signal line driving signal for each column of said signal lines;
providing said counter electrode with a counter electrode driving signal having a set frequency and a set cycle;
applying a first voltage to the other end of said auxiliary capacitance for a first half cycle of said counter electrode driving signal during the on time of said scanning line driving signal and applying a second voltage for a $(p+\frac{1}{2})$th cycle after said first half cycle of said counter electrode driving signal where p is 0 or a natural number; and
making said auxiliary capacitance line in a floating condition after said $(p+\frac{1}{2})$th cycle during the remaining holding time to thereby increase the absolute value in potential difference between said pixel electrode and said counter electrode.

13. A method of driving a liquid crystal display device as set forth in claim 12, wherein said first voltage is a voltage identical to that on said counter electrode and said second voltage is a voltage different from that on said counter electrode.

14. A method of driving a liquid crystal display device as set forth in claim 12, wherein said first voltage is a voltage identical to that on said counter electrode and said second voltage is a voltage inverted from that on said counter electrode.

15. A method of driving a liquid crystal display device as set forth in claim 14, wherein said second voltage is applied in synchronism with an on time of a scanning line $(G_{i+2})$ two rows ahead of the scanning line $(G_i)$ to which said switching element is connected.

16. A method of driving a liquid crystal display device as set forth in claim 13, wherein the voltage applied to said auxiliary capacitance is a voltage to reduce the amplitude of the signal applied to said counter electrode wiring.

17. A method of driving a liquid crystal display device as set forth in claim 13, wherein the voltage applied to said auxiliary capacitance is a DC voltage corresponding to an amplitude center of the signal applied to said counter electrode wiring.

18. A liquid crystal display device comprising:
a display part comprising:
a plurality of scanning lines arranged in rows, the rows being numbered from the top consecutively starting with 1 and ending with m,
a plurality of signal lines arranged in columns, the columns being numbered from the left consecutively staring with 1 and ending with n,
switching elements disposed at respective intersections of said scanning lines and said signal lines,
a pixel electrode connected to an output end of the respective switching element,
counter electrodes capacitively coupled with the respective pixel electrodes,
liquid crystal cells disposed between said pixel electrodes and said counter electrodes, thereby defining a matrix of m rows and n columns of pixels,
an auxiliary capacitance whose one end is connected to an output end of each of said switching elements,
a plurality of auxiliary capacitance lines arranged in rows, each of the auxiliary capacitance lines being connected to a corresponding row of the auxiliary capacitances, and
a parasitic capacitance shield wiring arranged to be interposed between the signal line and the auxiliary capacitance line at every intersection of the signal line the auxiliary capacitance line;
a scanning line driving circuit for providing each row of said scanning lines with a scanning line driving signal having an on time and a holding time in which the switching element in each row can be turned on and off, respectively;
a signal line driving circuit for providing a signal line driving signal for each column of said signal lines;
a counter electrode driving circuit for providing said counter electrodes with a counter electrode driving signal; and
an auxiliary capacitance line driving circuit for providing an auxiliary capacitance line driving signal for each row of said auxiliary capacitance lines, wherein
said auxiliary capacitance line driving circuit comprises a first and a second driving transistor connected to each of said auxiliary capacitance lines,
said first driving transistor has a first main electrode connected to the other end of said auxiliary capacitance,
said first driving transistor has a second main electrode connected to a counter electrode wiring (COM1) as a first common electrode,
said first driving transistor has a control electrode connected to an i th row scanning line (Gi),
said second driving transistor has a first main electrode connected to the first main electrode of said first driving transistor, said second driving transistor has a second main electrode connected to a second common electrode wiring (COM2), and said second driving transistor has a control electrode connected to an (i+2) th scanning line ($G_{i+2}$), and wherein said auxiliary capacitance line driving circuit is adapted to apply a first voltage to the auxiliary capacitance lines in a first half cycle of said counter electrode driving signal and apply a second voltage thereto in a (p+½) the cycle after said first period of said counter electrode driving signal where p is 0 or a natural number, said auxiliary capacitance line driving circuit making the auxiliary capacitance line in a floating condition after said (p+½) th cycle.

19. A liquid crystal display device as set forth in claim 18, wherein said auxiliary capacitance comprises a first auxiliary capacitance and a second auxiliary capacitance each of which has one end connected to said pixel electrode, and the other end of said first auxiliary capacitance is connected to said auxiliary capacitance line driving circuit while the other end of said second auxiliary capacitance is connected to each of said counter electrodes.

20. A liquid crystal display device as set forth in claim 18, wherein a DC voltage is applied to said parasitic capacitance shield wiring.

21. A liquid crystal display device as set forth in claim 18, wherein a counter electrode driving signal is applied to said parasitic capacitance shield wiring.

22. A liquid crystal display device as set forth in claim 18, wherein said display part is provided with a first substrate and a second substrate, said scanning lines and said signal lines are formed on said first substrate while said counter electrodes are formed on said second substrate.

23. A liquid crystal display device as set forth in claim 22, wherein said auxiliary capacitance has a wiring formed on said first substrate, an insulating film formed on said wiring and a transparent electrode formed on said insulating film.

24. A liquid crystal display device as set forth in claim 18, wherein said auxiliary capacitance line driving circuit is disposed adjacent to said display part, and said auxiliary capacitance line driving circuit comprises a thin film transistor using amorphous silicon or polysilicon.

25. A liquid crystal display device as set forth in claim 18, wherein said parasitic capacitance shield wiring is disposed parallel to said auxiliary capacitance line between said switching element and said auxiliary capacitance.

26. A liquid crystal display device as set forth in claim 22, wherein a first gate insulating film and a second gate insulating film are formed on said first substrate and said parasitic capacitance shield wiring is formed on said first gate insulating film.

27. A liquid crystal display device as set forth in claim 22, wherein said parasitic capacitance shield wiring has a linear portion formed on said first substrate and a protrusion formed on said first gate insulating film, and said protrusion and said rectilinear portion are connected together via a contact hole formed in said first gate insulating film.

28. A liquid crystal display device as set forth in claim 27, wherein the intersection of said parasitic capacitance shield wiring is composed of a transparent electrode material.

29. A method for driving a liquid crystal display, the liquid crystal display comprising a plurality of scanning lines disposed in rows and a plurality of signal lines disposed in columns, the plurality of scanning lines and the plurality of signal lines defining a m by n matrix of pixels, each of said pixels comprising:

a transistor having a gate, a source and a drain, the gate being connected to the adjacent scanning line, the source being connected to the adjacent signal line;

a pixel electrode connected to the drain of the transistor;

a liquid crystal layer over the pixel electrode;

a counter electrode forming a liquid crystal cell together with the liquid crystal layer and the pixel electrode; and an auxiliary capacitance electrode capacitively coupled to the pixel electrode, the auxiliary capacitance electrode forming an auxiliary capacitance together with the pixel electrode;

the method comprising the steps of:

applying scanning pulse signals of a set frame frequency to the plurality of scanning lines to turn on the transistors in rows, thereby successively selecting the rows of pixels from the top, wherein a period during which the transistor at a pixel is turned on defines a selection period for the pixel, and a period during which the transistor at the pixel is turned off defines a holding period for the pixel, providing display signals on the signal lines in synchronization with said scanning pulse signal to charge the corresponding pixel electrodes to respective desired potentials;

applying a rectangular wave signal that alternately exhibits a HIGH level and a LOW level at a set frequency to said counter electrodes, the rectangular wave signal assuming one of the HIGH and LOW levels during the selection period for each pixel;

for each of the plurality of pixels, applying a first voltage to the auxiliary capacitance electrode during the selection period, and applying a second voltage that differs from the first voltage to the auxiliary capacitance electrode when the rectangular wave signal assumes said one of the HIGH and LOW levels during the holding period that follows the selection period, the auxiliary capacitance electrode being made in a floating condition immediately thereafter during the remaining holding time until the next selection period arrives for the pixel, a value of the second voltage being selected such that an absolute value of a voltage across the liquid crystal cell is raised when the second voltage is applied.

30. A liquid crystal display device comprising:

a plurality of scanning lines disposed in rows and a plurality of signal lines disposed in columns, the plurality of scanning lines and the plurality of signal lines defining a m by n matrix of pixels, each of said pixels comprising:

a transistor having a gate, a source and a drain, the gate being connected to the adjacent scanning line, the source being connected to the adjacent signal line;

a pixel electrode connected to the drain of the transistor;

a liquid crystal layer over the pixel electrode;

a counter electrode forming a liquid crystal cell together with the liquid crystal layer and the pixel electrode; and an auxiliary capacitance electrode capacitively coupled to the pixel electrode, the auxiliary capacitance electrode forming an auxiliary capacitance together with the pixel electrode;

a scanning line driver configured to apply scanning pulse signals of a set frame frequency to the plurality of scanning lines to turn on the transistors in rows, thereby successively selecting the rows of pixels from the top, wherein a period during which the transistor at a pixel is turned on defines a selection period for the pixel, and a period during which the transistor at the pixel is turned off defines a holding period for the pixel, a signal driver configured to provide display signals on the signal lines in synchronization with said scanning pulse signal to charge the corresponding pixel electrodes to respective desired potentials;

a counter electrode driver configured to apply a rectangular wave signal that alternately exhibits a HIGH level and a LOW level at a set frequency to said counter electrodes, the rectangular wave signal assuming one of the HIGH and LOW levels during the selection period for each pixel;

an auxiliary capacitance electrode driver configured to apply, for each of the plurality of pixels, a first voltage to the auxiliary capacitance electrode during the selection period, and applying a second voltage that differs from the first voltage to the auxiliary capacitance electrode when the rectangular wave signal assumes said one of the HIGH and LOW levels during the holding period that follows the selection period, the auxiliary capacitance electrode being made in a floating condition immediately thereafter during the remaining holding time until the next selection period arrives for the pixel, a value of the second voltage being selected such that an absolute value of a voltage across the liquid crystal cell is raised when the second voltage is applied.

* * * * *